US011765591B2

(12) United States Patent
Wada

(10) Patent No.: US 11,765,591 B2
(45) Date of Patent: Sep. 19, 2023

(54) MOBILE TERMINAL AND IC CHIP MANAGEMENT METHOD

(71) Applicant: FeliCa Networks, Inc., Tokyo (JP)

(72) Inventor: Makoto Wada, Kanagawa (JP)

(73) Assignee: FeliCa Networks, Inc., Tokyo (JP)

(*) Notice: Subject to any disclaimer, the term of this patent is extended or adjusted under 35 U.S.C. 154(b) by 342 days.

(21) Appl. No.: 17/055,209

(22) PCT Filed: May 7, 2019

(86) PCT No.: PCT/JP2019/018210
§ 371 (c)(1),
(2) Date: Nov. 13, 2020

(87) PCT Pub. No.: WO2019/225301
PCT Pub. Date: Nov. 28, 2019

(65) Prior Publication Data
US 2021/0120422 A1    Apr. 22, 2021

(30) Foreign Application Priority Data

May 21, 2018  (JP) ................. 2018-096851

(51) Int. Cl.
*H04W 12/30* (2021.01)
*G06F 12/14* (2006.01)
(Continued)

(52) U.S. Cl.
CPC ........ *H04W 12/30* (2021.01); *G06F 12/1458* (2013.01); *G06F 21/6218* (2013.01);
(Continued)

(58) Field of Classification Search
CPC ............. H04W 12/30; G06F 12/1458; G06F 12/1441; G06F 21/6218; G06F 21/78;
(Continued)

(56) References Cited

U.S. PATENT DOCUMENTS 6,736,726 B1 * 5/2004 Miura ................. A63F 13/79
709/219
2017/0352197 A1 * 12/2017 Mitsunaga ........... G06V 10/141
2018/0052628 A1 * 2/2018 Endo ................. G06F 3/0655

FOREIGN PATENT DOCUMENTS

JP    2003-150450 A    5/2003
JP    2003150450 A *   5/2003
(Continued)

*Primary Examiner* — Han Yang
(74) *Attorney, Agent, or Firm* — Paratus Law Group, PLLC

(57) ABSTRACT

There is provided a mobile terminal and an IC chip management method that make it possible to protect an IC chip from unauthorized access. An IC chip of a device includes a memory forming a protection-target region that is a storage region for predetermined information targeted for protection and a specific-state region that is a storage region for state information representing a specific state of a user. The device includes the IC chip and a control section that performs control so as to bring the protection-target region to a usage-unpermitted state in the case where, in the IC chip, the state information is changed to information representing a state in which the predetermined information is not used. The present technology can be applied to a near-field wireless communication system.

19 Claims, 18 Drawing Sheets

(51) Int. Cl.
  *G06F 21/78*  (2013.01)
  *G06F 21/62*  (2013.01)
(52) U.S. Cl.
  CPC ...... *G06F 21/78* (2013.01); *G06F 2212/1052* (2013.01); *G06F 2221/2111* (2013.01); *G06F 2221/2137* (2013.01)
(58) Field of Classification Search
  CPC ............. G06F 21/6236; G06F 21/6245; G06F 2212/1052; G06F 2221/2111; G06F 2221/2137
  See application file for complete search history.

(56) References Cited

FOREIGN PATENT DOCUMENTS

| | | | |
|---|---|---|---|
| JP | 2009-128930 A | 6/2009 | |
| JP | 2011-123708 A | 6/2011 | |
| JP | 2014-236238 A | 12/2014 | |
| WO | WO 2009/119853 A1 | 10/2009 | |
| WO | WO-2009119853 A1 * | 10/2009 | ........ H04M 1/72577 |
| WO | WO 2016/125603 A1 | 8/2016 | |

* cited by examiner

F I G. 4

| NUMERICAL VALUE OF SPECIFIC-STATE REGION | |
|---|---|
| 91 — INSIDE-TICKET-GATE STATE | HAVING NO USAGE INTENTION |
| OUTSIDE-TICKET-GATE STATE | HAVING USAGE INTENSION |
| 92 — INSIDE-CONCERT-VENUE STATE | HAVING NO USAGE INTENSION |
| OUTSIDE-CONCERT-VENUE STATE | HAVING USAGE INTENSION |

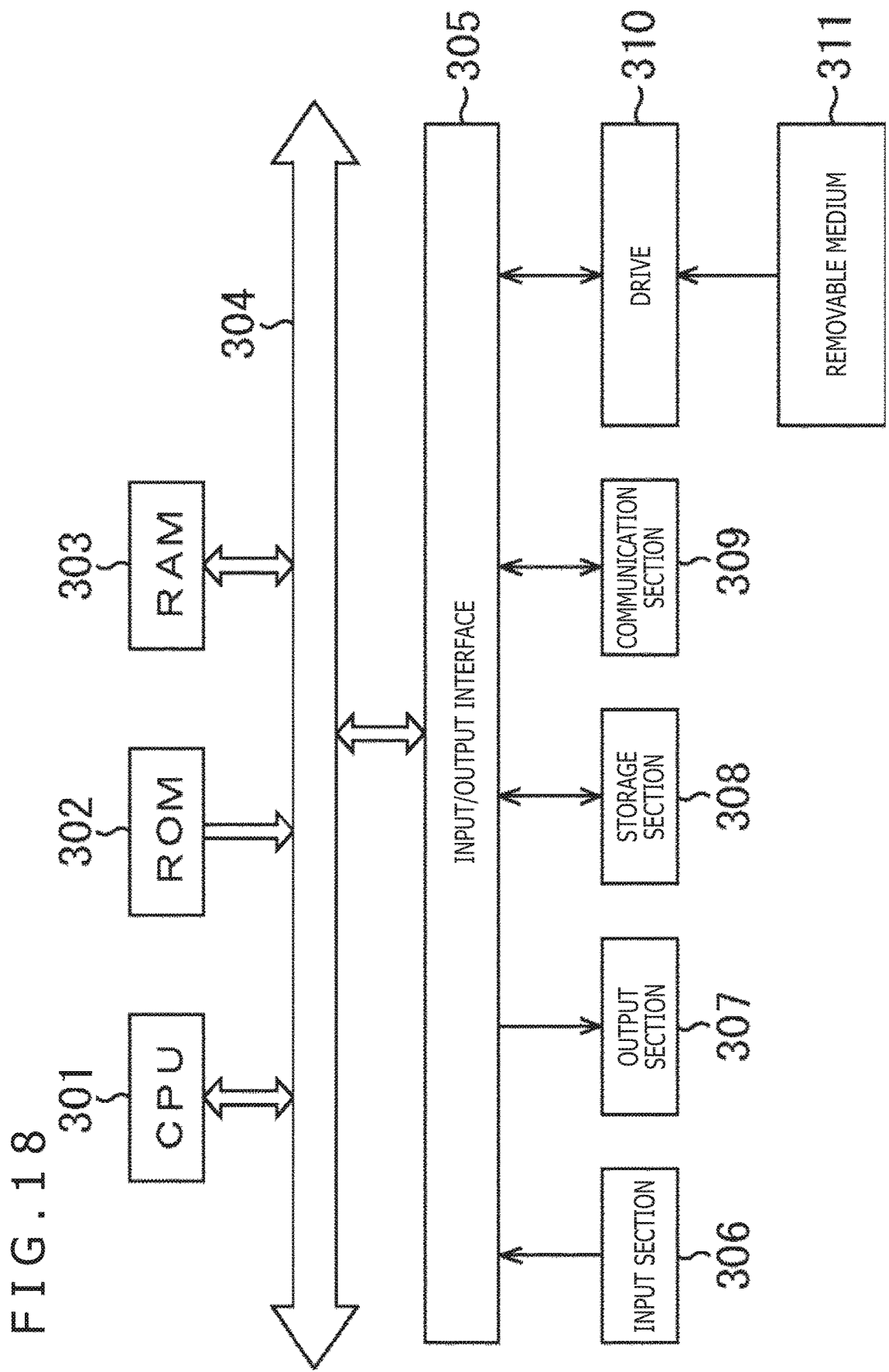

MOBILE TERMINAL AND IC CHIP MANAGEMENT METHOD

CROSS REFERENCE TO PRIOR APPLICATION

This application is a National Stage Patent Application of PCT International Patent Application No. PCT/JP2019/018210 (filed on May 7, 2019) under 35 U.S.C. § 371, which claims priority to Japanese Patent Application No. 2018-096851 (filed on May 21, 2018), which are all hereby incorporated by reference in their entirety.

TECHNICAL FIELD

The present technology relates to mobile terminals and IC chip managements, and in particular, relates to a mobile terminal and an IC chip management method that are configured to make it possible to protect an IC chip from unauthorized access.

BACKGROUND ART

Mobile-phones and non-contact type IC cards are frequently provided with the function of handling personal information such as electronic money or a member ID and there exist threats of skimming in which an owner of such a mobile-phone or an IC card accidentally has his or her personal information stolen and read.

Various proposals have been made against such threats of skimming, and, for example, in PTL 1, a method is proposed for switching the permission/non-permission of the usage of electronic money according to the posture (angle) of a mobile terminal (see PTL 1).

CITATION LIST

Patent Literature

[PTL 1]
JP 2014-236238A

SUMMARY

Technical Problem

With the recent spread of mobile terminals typified by smartphones, in particular, a service for reading a card outside a mobile terminal and making payment has been in widespread use. For this reason, the threat of skimming abusing techniques for such a service has been growing.

The present technology has been made in view of such a situation and is intended to make it possible to protect an IC chip from unauthorized access.

Solution to Problem

A mobile terminal according to an aspect of the present technology includes an IC chip including a memory forming a protection-target region that is a storage region for predetermined information targeted for protection and a specific-state region that is a storage region for state information representing a specific state of a user; and a control section that performs control so as to bring the protection-target region to a usage-unpermitted state in the case where, in the IC chip, the state information is changed to information representing a state in which the predetermined information is not used.

According to another aspect of the present technology, in the case where, in an IC chip including a memory forming a protection-target region that is a storage region for predetermined information targeted for protection and a specific-state region that is a storage region for state information representing a specific state of a user, the state information is changed to information representing a state in which the predetermined information is not used, control is performed to bring the protection-target region to a usage-unpermitted state.

Advantageous Effect of Invention

According to the present technology, the IC chip can be protected from unauthorized access.

Note that the effects of the present technology are not necessarily limited to the effect described here and may be any effects described in the present disclosure.

BRIEF DESCRIPTION OF DRAWINGS

FIG. 4 is a diagram illustrating an example of correspondence relations between numerical values of specific-state regions and user's usage intentions of protection-target regions.

FIG. 18 is a block diagram illustrating a configuration example of hardware of a computer.

DESCRIPTION OF EMBODIMENTS

Hereinafter, configurations for implementing the present technology will be described. The description will be made in the following order.

1. First Embodiment (Example of determination as to permission/non-permission of usage based on user's state)

2. Second Embodiment (Example of determination as to permission/non-permission of usage further based on time zone)

3. Third Embodiment (Example of determination as to permission/non-permission of usage further based on user's location)

4. Fourth Embodiment (Example of determination as to permission/non-permission of usage further based on numerical value of information regarding protection-target region)

5. Fifth Embodiment (Example of determination as to permission/non-permission of usage further based on constant period of time)

6. Sixth Embodiment (Example of determination as to permission/non-permission of usage further based on time information associated with state information regarding specific-state region)

7. Seventh Embodiment (Example of determination as to permission/non-permission of usage further based on total number of usage of specific-state region)

8. Computer

1. First Embodiment (Example of Determination as to Permission/Non-Permission of Usage Based on User's State)

<Overview>

Figure 1:
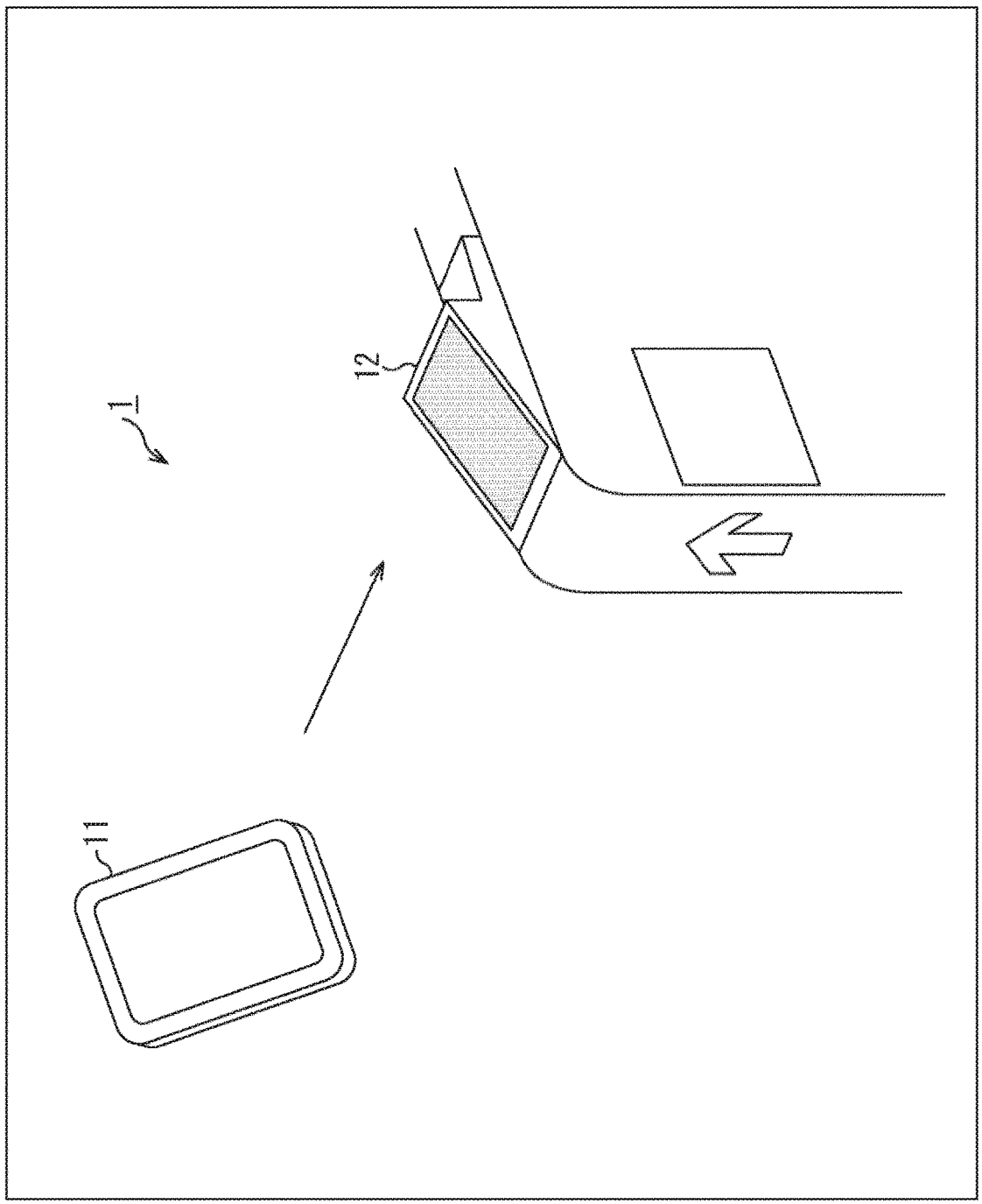
FIG. 1 is a diagram illustrating an example of a wireless communication system according to the present technology.

FIG. 1 is a diagram illustrating an example of a wireless communication system according to the present technology.

As illustrated in FIG. 1, a wireless communication system 1 is used when a user brings a device 11 including an IC chip close to a reader/writer 12 installed in, for example, a ticket gate of a station, to thereby enter the ticket gate.

The device 11 is a mobile terminal portable by a user, such as a smartphone or a mobile phone. The device 11 may be configured by a wearable terminal such as a head-mounted display or a watch. The device 11 performs near-field wireless communication with the reader/writer 12 in a non-contact manner via electromagnetic waves.

In the case where the IC chip included in the device 11 is brought close to the reader/writer 12, the IC chip executes a command having been transmitted from the reader/writer 12 and performs predetermined processing such as reading/writing of data stored in a memory incorporated therein.

The reader/writer 12 performs near-field wireless communication with the IC chip of the device 11 via electromagnetic waves to transmit a predetermined command to the IC chip and allow the IC chip to execute the command and to receive a process result of the command, transmitted from the IC chip. Among commands transmitted by the reader/writer 12, there is, for example, a command for writing a numerical value indicating that the user is in an inside-ticket-gate state.

In the memory inside the IC chip, there are provided a specific-state region in which the numerical value representing that the user is in the inside-ticket-gate state is written and a protection-target region that is a storage region for, for ;example, an electronic money balance, which is a protection target.

In the case where, in response to a transmitted command, the numerical value representing that the user is in the inside-ticket-gate state is written into a specific-state region of the IC chip, the device 11 determines that the user has no intention of using a protection-target region inside the IC chip, and performs control for bringing the protection-target region to a usage-unpermitted state. In the device 11, information which represents which of numerical values that are each to be written into the specific-state region indicates that the user has an intention of using the protection-target region (intention of using information stored in the protection-target region) is managed.

The usage-permitted state/usage-unpermitted state of a protection-target region inside the IC chip is switched in response to a command transmitted from the reader/writer 12, and thus, the user can prevent skimming in a situation of riding a train and any other skimming in a similar situation without setting by himself or herself permission/non-permission of usage of an electronic money function and any other protection target.

<Configuration Example of Wireless Communication System>

Figure 2:
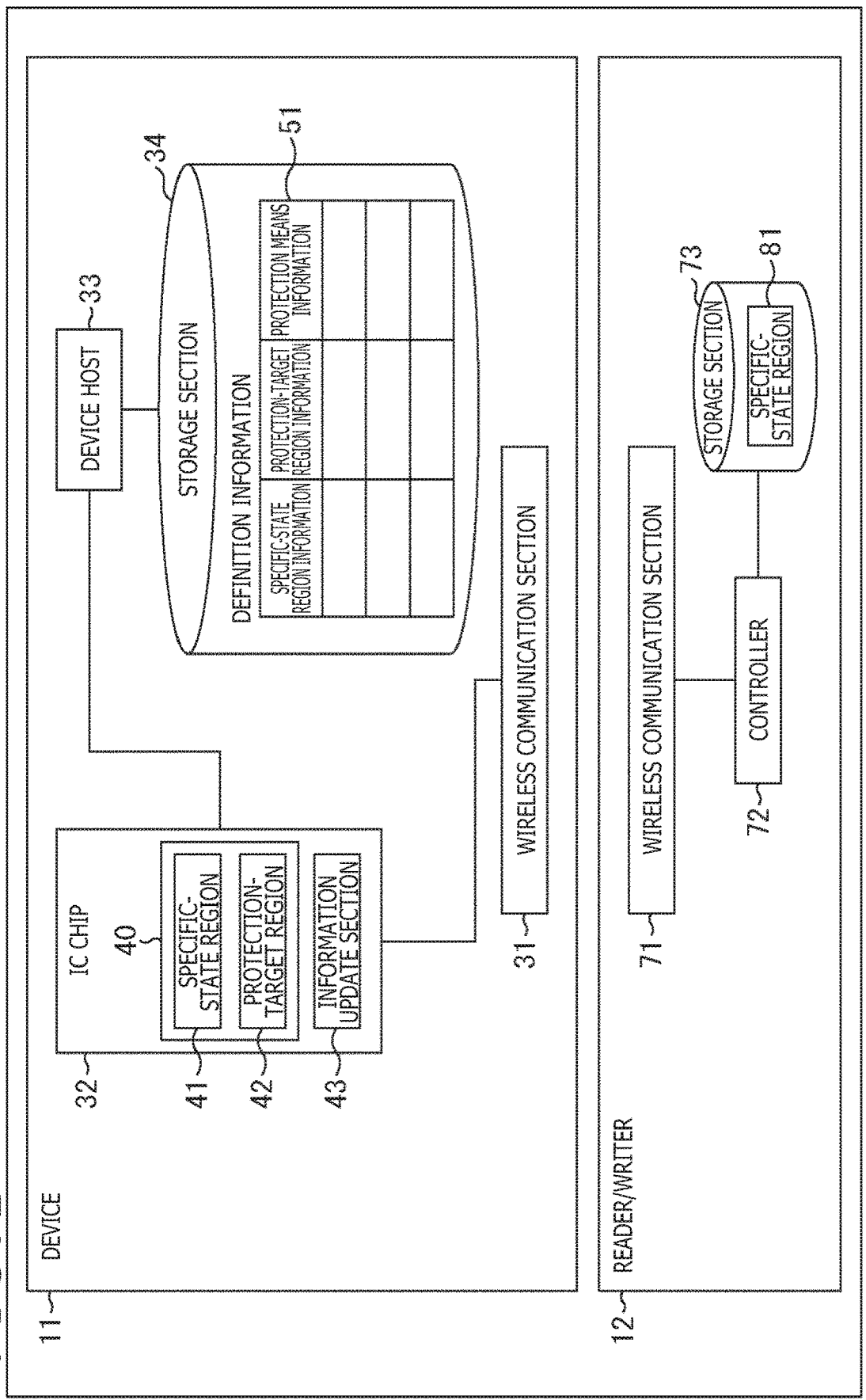
FIG. 2 is a block diagram illustrating configuration examples of a device and a reader/writer.

FIG. 2 is a block diagram illustrating configuration examples of a device and a reader/writer.

The device 11 includes a wireless communication section 31, an IC chip 32, a device host 33, and a storage section 34.

The wireless communication section 31 receives a command transmitted from the reader/writer 12 and outputs the received command to the IC chip 32. The wireless communication section 31 transmits a process result of the command to the reader/writer 12.

The IC chip 32 includes a memory 40 forming a specific-state region 41 and a protection-target region 42; and an information update section 43. The information update section 43 is implemented by allowing, for example, a controller (not illustrated) inside the IC chip 32 to execute a predetermined program.

The specific-state region 41 is a storage region for pieces of state information representing specific states of the user. The specific-state region 41 forms a plurality of specific-state regions that stores the pieces of state information used for determination as to permission/non-permission of the usage of a plurality of protection-target regions.

The protection-target region 42 is a storage region for pieces of predetermined information targeted for protection. The protection-target region 42 forms, for respective kinds of the pieces of predetermined information, a plurality of protection-target regions. The protection-target region 42 includes a protection-target region that stores an electronic money balance and a protection-target region that stores personal information such as a name.

The information update section 43 executes a command supplied from the wireless communication section 31 and executes a predetermined process such as reading/writing of data stored in the specific-state region 41 and the protection-target region 42. The information update section 43 notifies the device host 33 of a process result of the predetermined process, as an event.

According to control that the device host 33 performs in response to the notification of the event, the information update section 43 brings a protection-target region formed in the protection-target region 42 to the usage-unpermitted state or the usage-permitted state.

Upon receipt of the event notification supplied from the information update section 43, the device host 33 makes a determination as to the permission/non-permission of the usage of a protection-target region on the basis of definition information 51 stored in the storage section 34. The definition information 51 is information that defines states in which the protection-target regions formed in the protection-target region 42 are to be brought to the usage-permitted states or the usage-unpermitted states. The device host 33 brings a protection-target region formed in the protection-target region 42 of the IC chip 32 to the usage-permitted state or the usage-unpermitted state on the basis of a result of the determination as to the permission/non-permission of the usage. The device host 33 is configured by, for example, a CPU.

The storage section 34 includes a non-volatile memory. The storage section 34 stores the definition information 51.

The definition information 51 includes specific-state region information, protection-target region information, and protection means information.

The specific-state region information defines which of numerical values (states) that are each to be written into a specific-state region indicates that the user has no usage intention and is to bring a protection-target region to the usage-unpermitted state. The specific-state region information may also define which of numerical values that are each to be written into a specific-state region indicates that the user has usage intention and is to bring a protection-target region to the usage-permitted state.

The protection-target region information defines which of the protection-target regions is to be brought to the usage-unpermitted state.

The protection means information defines which of protection methods is to be used to bring a protection-target region to the usage-unpermitted state. As the protection methods, there are methods that make a protection-target region invisible from the reader/writer 12, namely, a method of stopping receiving, by the IC chip 32, all commands from wired links and wireless links; a method of stopping receiving, by the IC chip 32, all commands from wireless links; and a method of causing the IC chip 32 to execute a command for making the protection-target region invisible.

Note that the definition information 51 may be defined in advance by a manufacturer or may be defined in advance by the user before the usage.

The reader/writer 12 includes a wireless communication section 71, a controller 72, and a storage section 73. The storage section 73 forms a specific-state region 81 that is a storage region for pieces of state information representing specific states of the user.

The wireless communication section 71 transmits a command supplied from the controller 72 to the device 11 and receives a process result of the command, transmitted from the device 11.

The controller 72 controls operations of individual portions of the reader/writer 12.

The controller 72 retrieves a numerical value that is a piece of state information representing a specific state of the user from the specific-state region 81 of the storage section 73. The controller 72 outputs a command for writing the retrieved numerical value, which represents a specific state of the user, into a specific-state region formed in the specific-state region 41 of the IC chip 32 to the wireless communication section 71 to allow the wireless communication section 71 to transmit the command to the IC chip 32.

Specifically, in the case where the reader/writer 12 is installed in the ticket gate, when the user enters the ticket gate, the controller 72 retrieves a numerical value representing that the user is in the inside-ticket-gate state from the specific-state region 81 of the storage section 73. The controller 72 outputs a command for writing the numerical value, which represents that the user is in the inside-ticket-gate state, into a specific-state region formed in the specific-state region 41 of the IC chip 32 to the wireless communication section 71.

Further, when the user exits the ticket gate, the controller 72 retrieves a numerical value representing that the user is in an outside-ticket-gate state from the specific-state region 81 of the storage section 73. The controller 72 outputs a command for writing the numerical value, which represents that the user is in the outside-ticket-gate state, into a specific-state region formed in the specific-state region 41 of the IC chip 32 to the wireless communication section 71.

The storage section 73 includes, for example, a non-volatile memory.

<Configuration Example of Specific-State Region>

Figure 3:
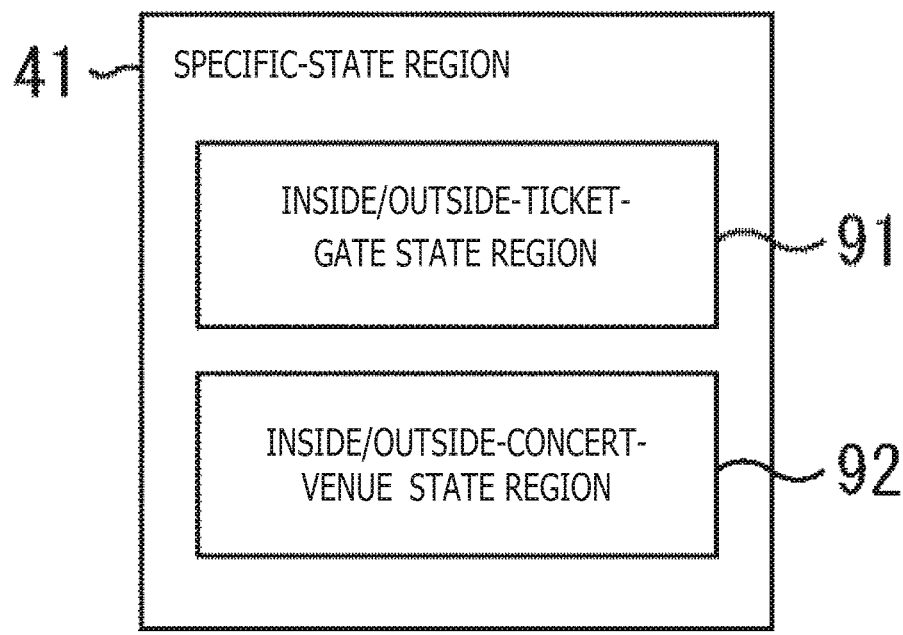
FIG. 3 is a diagram illustrating a configuration example of a specific-state region of an IC chip.

FIG. 3 is a diagram illustrating a configuration example of a specific-state region of an IC chip.

For example, as illustrated in FIG. 3, the specific-state region 41 forms an inside/outside-ticket-gate state region 91 and an inside/outside-concert-venue state region 92.

The inside/outside-ticket-gate state region 91 is a storage region for a piece of state information representing user's state of being inside/outside the ticket gate of the station. For example, the inside/outside-ticket-gate state region 91 stores a numerical value representing that the user is in the inside-ticket-gate state or a numerical value representing that the user is in the outside-ticket-gate state.

The inside/outside-concert-venue state region 92 is a storage region for a piece of state information representing a user's used/unused state of a concert ticket. For example, the inside/outside-concert-venue state region 92 stores a numerical value representing the used state of the concert ticket or a numerical value representing the unused state of the concert ticket.

FIG. 4 is a diagram illustrating an example of correspondence relations between numerical values of specific-state regions and user's usage intentions of protection-target regions. Such correspondence relations are defined by the definition information 51.

As depicted at a first row of FIG. 4, it is defined that, in the case where the numerical value of a specific-state region represents the inside-ticket-gate state, the user has no usage intention and a protection-target region targeted for protection is to be brought to the usage-unpermitted state. Further, as depicted at a second row, it is defined that, in the case where the numerical value of the specific-state region indicates the outside-ticket-gate state, the user has usage intention and the protection-target region targeted for protection is to be brought to the usage-permitted state.

As depicted at a third row of FIG. 4, it is defined that, in the case where the numerical value of a specific-state region indicates the inside-concert-venue state, the user has no usage intention and a protection-target region targeted for protection is to be brought to the usage-unpermitted state. Further, as depicted at a fourth row, it is defined that, in the case where the numerical value of the specific-state region indicates the outside-concert-venue state, the user has usage intention and the protection-target region targeted for protection is to be brought to the usage-permitted state <Operation of Device>

Here, processing by the device 11 of FIG. 2 will be described with reference to a flowchart in FIG. 5.

Figure 5:
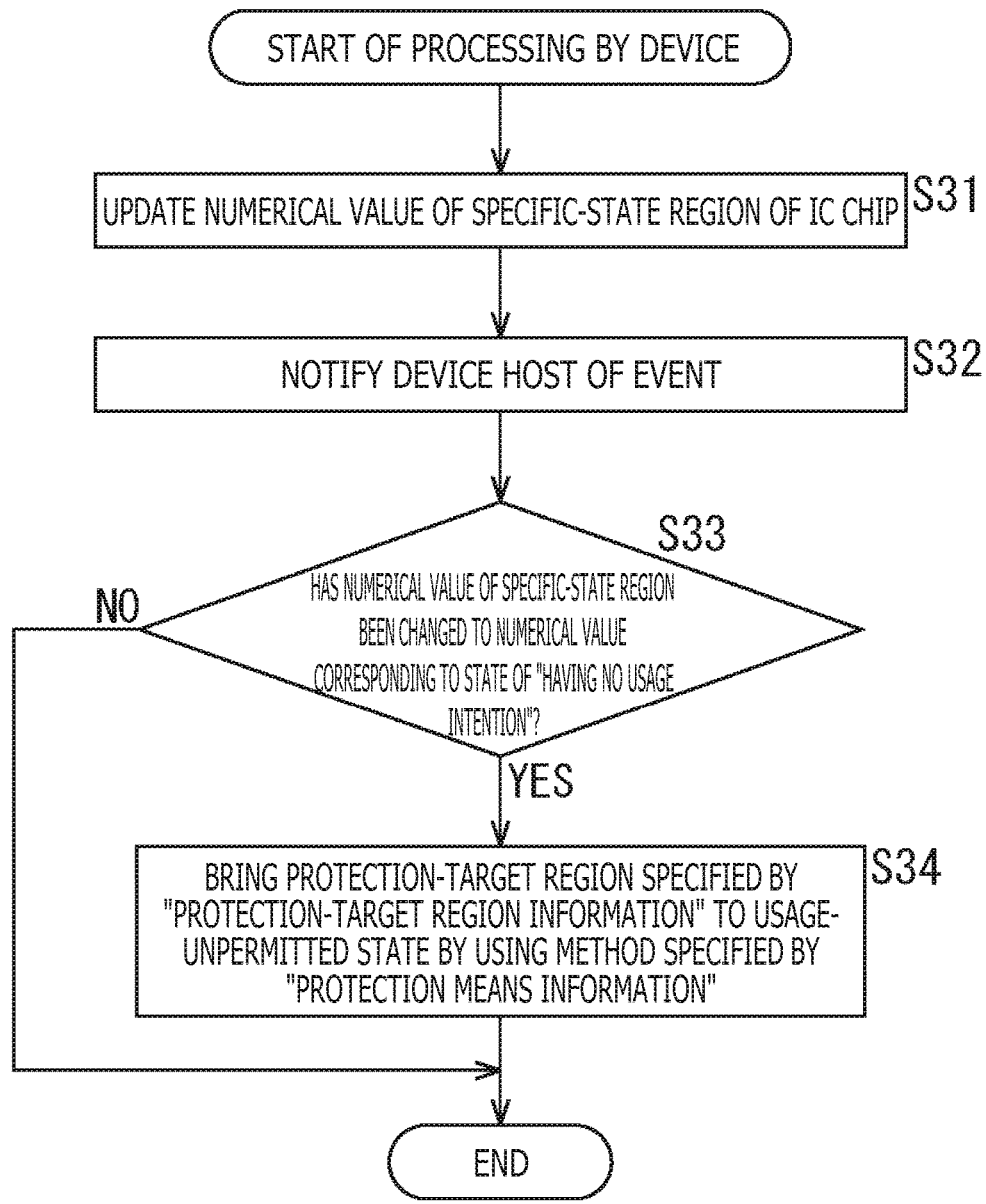
FIG. 5 is a flowchart that describes processing by the device of FIG. 2.

Before the start of the processing of FIG. 5, for example, the wireless communication section 71 of the reader/writer 12 is in a state of performing polling. In the case where the user brings the device 11 close to the reader/writer 12, a response to the reception of the polling is transmitted to the reader/writer 12 from the wireless communication section 31 of the device 11.

In the case where the response to the polling has been transmitted from the device 11, the controller 72 of the reader/writer 12 retrieves a numerical value representing a specific state of the user from the specific-state region 81 and outputs the numerical value to the wireless communication section 71. The wireless communication section 71 transmits a command for writing the numerical value representing the specific state of the user to the device 11.

The wireless communication section 31 of the device 11 receives the command having been transmitted from the reader/writer 12 and outputs the command to the information update section 43. In the device 11 and the reader/writer 12, such processes are performed as pre-processing of the processing of FIG. 5.

In step S31, the information update section 43 updates a numerical value of a specific-state region formed in the specific-state region 41 of the IC chip 32, by executing the command having been supplied from the wireless communication section 31.

In step S32, the information update section 43 notifies the device host 33 of an event in which the numerical value of the specific-state region formed in the specific-state region 41 of the IC chip 32 has been updated.

In step S33, the device host 33 determines whether or not the numerical value of the specific-state region has been changed to a numerical value corresponding to a state of "having no usage intention," on the basis of the definition information 51 of the storage section 34.

In the case where it is determined in step S33 that the numerical value of the specific-state region has been changed to the numerical value corresponding to the state of "having no usage intention," the processing proceeds to step S34.

In step S34, on the basis of the definition information 51 of the storage section 34, the device host 33 brings a protection-target region formed in the protection-target region 42 and specified by the "protection-target region information" to the usage-unpermitted state by using a method specified by the "protection means information." For example, according to the numerical value representing the inside-ticket-gate state, the protection-target region formed in the protection-target region 42 of the IC chip 32 is brought to the usage-unpermitted state.

In the case where it is determined in step S33 that the numerical value of the specific-state region has not been changed to any of numerical values each representing the state of "having no usage intention," the process in step S34 is skipped, and the processing by the device 11 is ended. For example, according to the numerical value representing the outside-ticket-gate state, the protection-target region formed in the protection-target region 42 of the IC chip 32 remains in the usage-permitted state.

As described above, according to a specific state of the user, a protection-target region can be brought to the usage-unpermitted state.

This configuration allows a protection-target region to be brought to the usage-unpermitted state while the user is inside the ticket gate, and thus makes it possible to prevent the skimming in a situation in which the user is inside the ticket gate or is riding a train.

2. Second Embodiment (Example of Determination as to Permission/Non-Permission of Usage Further Based on Time Zone)

<Configuration Example of Device>

Figure 6:
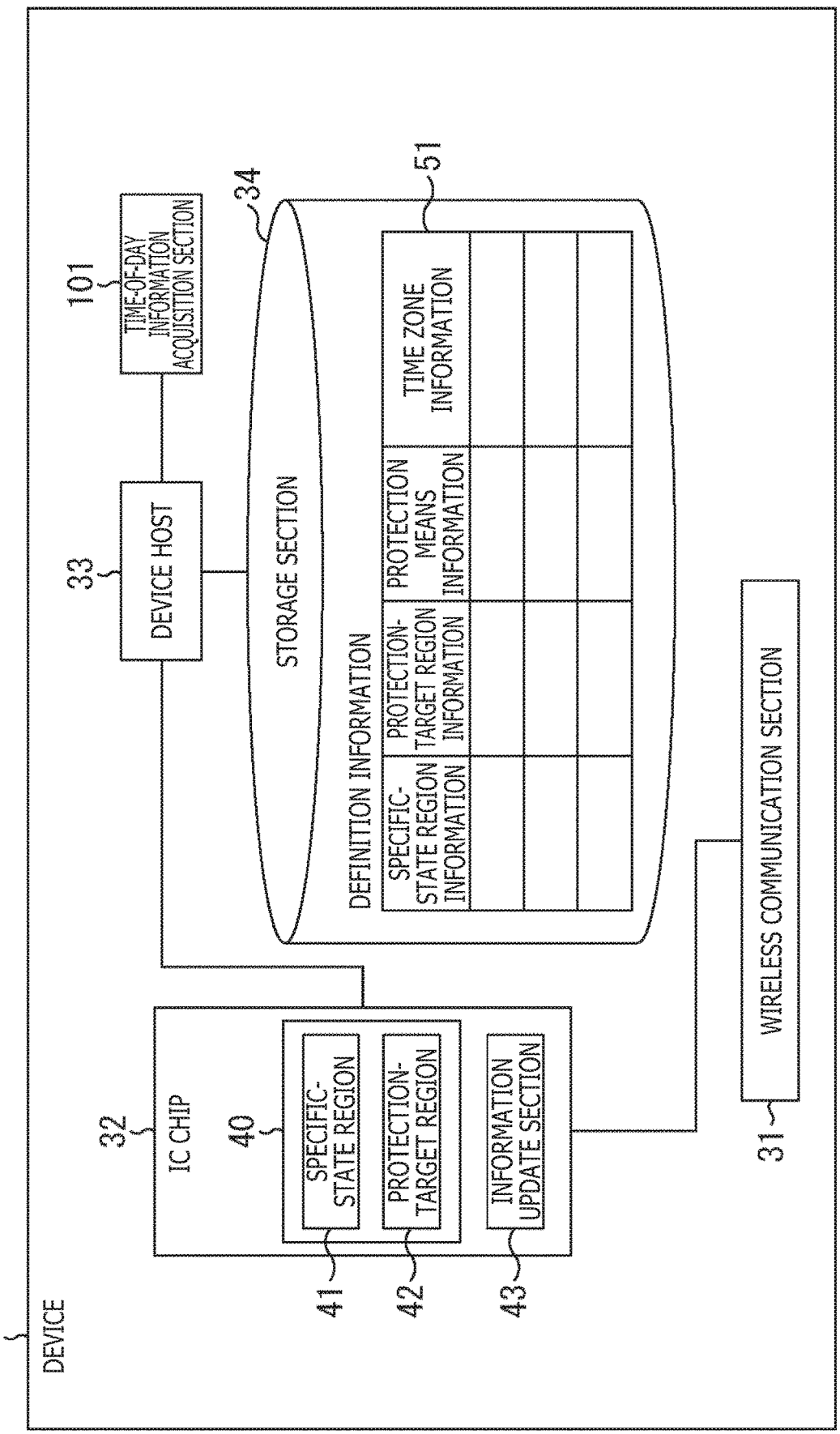
FIG. 6 is a block diagram illustrating a second configuration example of a device.

FIG. 6 is a block diagram illustrating a second configuration example of the device.

In the device 11 of FIG. 6, a protection-target region is brought to the usage-unpermitted state only during a specific time zone such as a rush hour.

Among constituent elements illustrated in FIG. 6, the same constituent element as that having been described with reference to FIG. 2 is denoted by the same reference sign. Its repeated description will be omitted as appropriate.

The configuration illustrated in FIG. 6 is different from the configuration of the device 11 of FIG. 2 in that a time-of-day information acquisition section 101 is added. Further, time zone information is added in the definition information 51 of the storage section 34. In the example of FIG. 6, also in view of a current time-of-day, it is determined which of the usage-permitted state and the usage-unpermitted state a protection-target region is to be brought to.

The time-of-day information acquisition section 101 acquires time-of-day information inside the device 11 and outputs the acquired time-of-day information to the device host 33.

In the definition information 51, the time zone information that indicates time zones, such as a rush hour, during which a protection-target region is to be brought to the usage-unpermitted state is defined so as to be associated with a specific-state region.

In the case where the time-of-day information being inside the device 11 and having been supplied from the time-of-day information acquisition section 101 falls within a range specified by the defined time zone information, the device host 33 brings the protection-target region to the usage-unpermitted state.

<Operation of Device>

Figure 7:
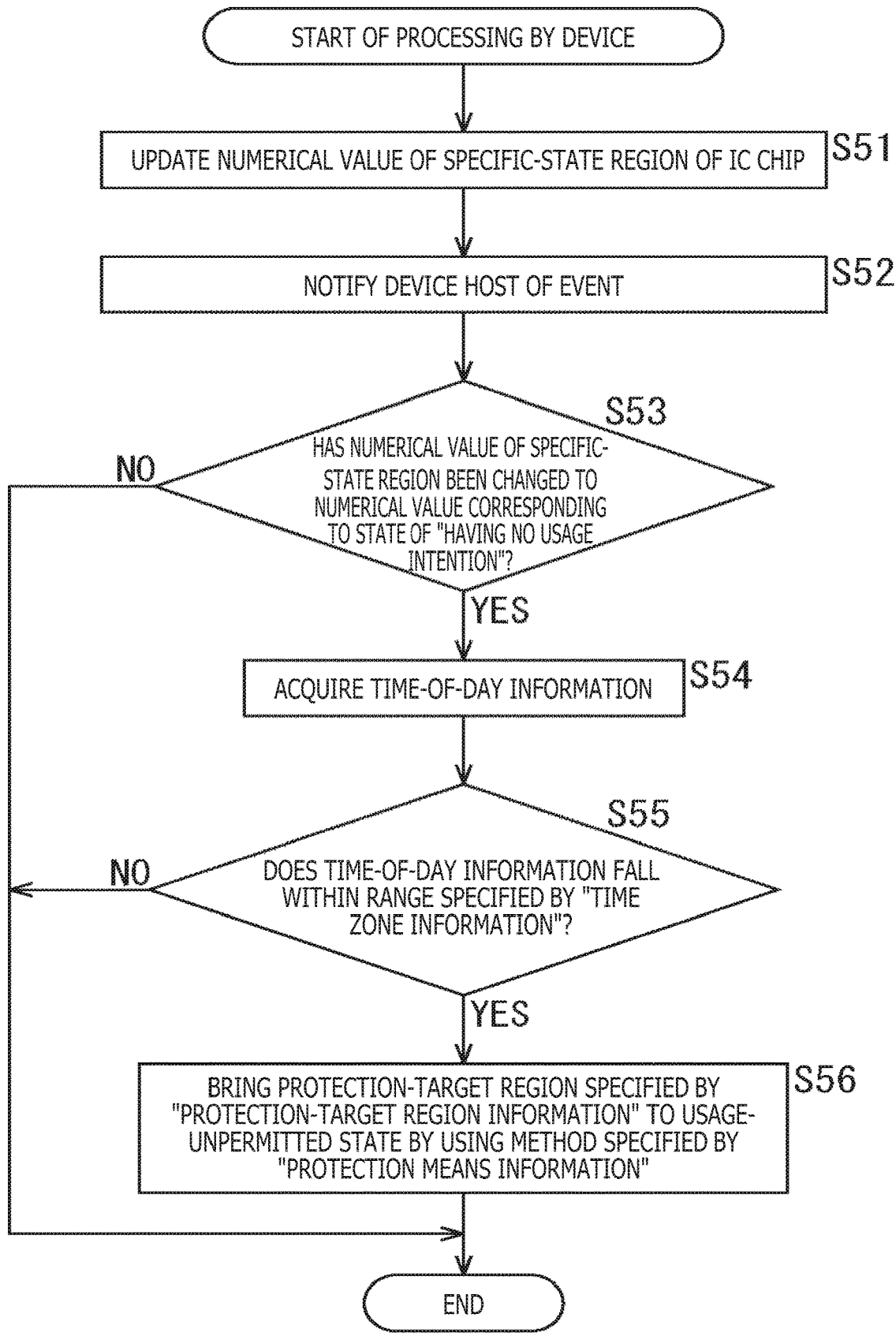
FIG. 7 is a flowchart that describes processing by the device of FIG. 6.

FIG. 7 is a flowchart that describes processing by the device of FIG. 6.

Processes in steps S51 to S53 of FIG. 7 are the same as the processes in steps S31 to S33 of FIG. 5, and thus, descriptions thereof will be omitted.

In the case where it is determined in step S53 that the numerical value of the specific-state region has been changed to a numerical value corresponding to the state of "having no usage intention," in step S54, the time-of-day information acquisition section 101 acquires time-of-day information inside the device 11 and outputs the acquired time-of-day information to the device host 33.

In step S55, the device host 33 determines whether or not the time-of-day information being inside the device 11 and having been supplied from the time-of-day information acquisition section 101 falls within a range specified by the defined "time zone information."

In the case where it is determined in step S55 that the time-of-day information inside the device 11 falls within the range specified by the "time zone information," the processing proceeds to step S56.

In step S56, on the basis of the definition information 51 of the storage section 34, the device host 33 brings a protection-target region formed in the protection-target region 42 and specified by the "protection-target region information" to the usage-unpermitted state by using a method specified by the "protection means."

In the case where it is determined in step S53 that the numerical value of the specific-state region has not been changed to any of numerical values each corresponding to the state of "having no usage intention," processes in steps S54 to S56 are skipped, and the processing by the device 11 is ended. In the case where it is determined in step S55 that the time-of-day information inside the device 11 does not fall within the range specified by the "time zone information," similarly, the processing by the device 11 is ended.

As described above, within a range specified by the "time zone information" indicating a rush hour and the like, a protection-target region can be brought to the usage-unpermitted state according to a specific state of the user.

3. Third Embodiment (Example of Determination as to Permission/Non-Permission of Usage Further Based on User's Location)

Figure 8:
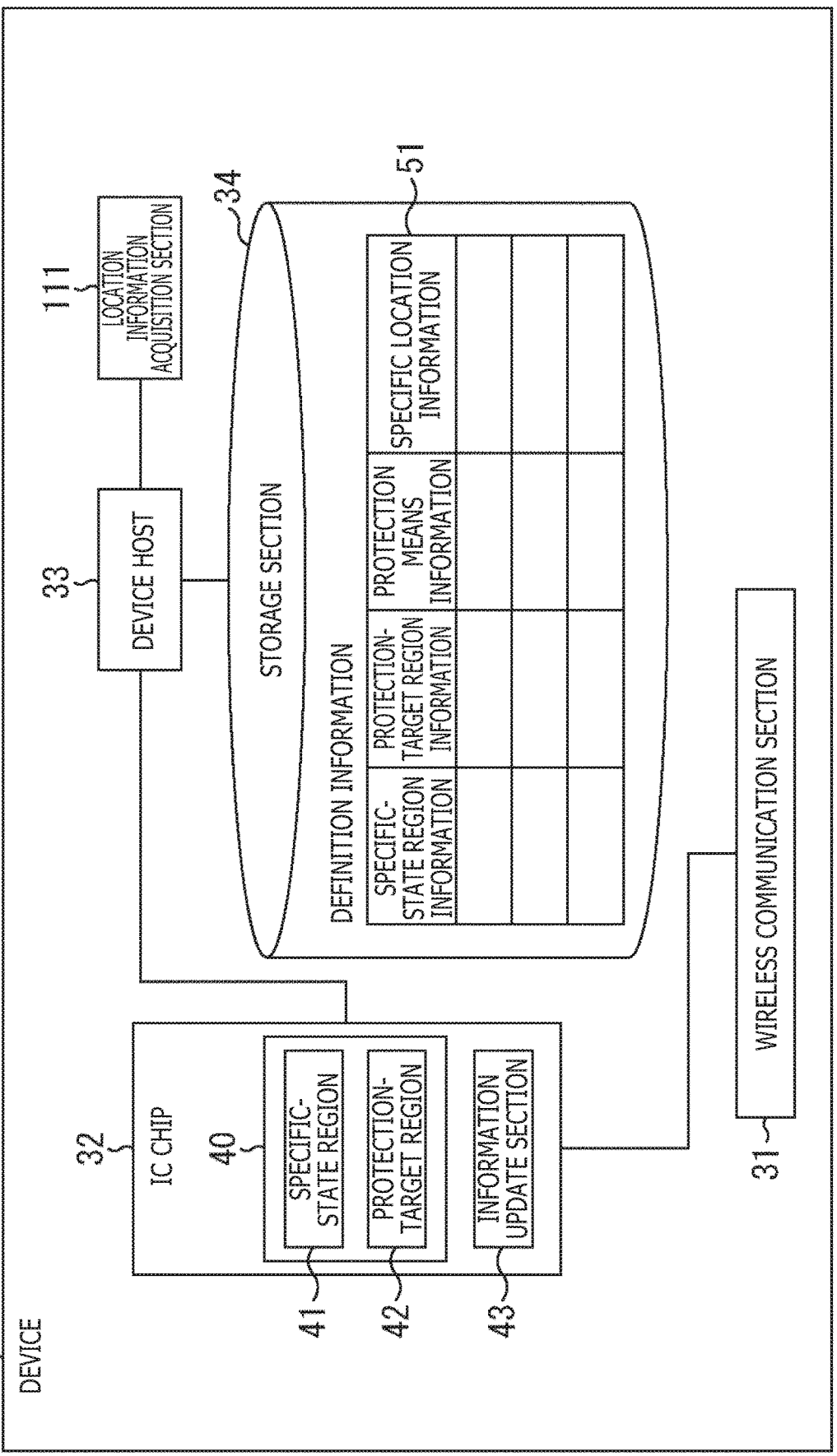
FIG. 8 is a block diagram illustrating a third configuration example of a device.

<Configuration Example of Device>
FIG. 8 is a block diagram illustrating a third configuration example of the device.

In the device 11 of FIG. 8, a protection-target region is brought to the usage-unpermitted state only within specific areas such as an urban area and a specific venue.

Among constituent elements illustrated in FIG. 8, the same constituent element as that having been described with reference to FIG. 2 is denoted by the same reference sign. Its repeated description will be omitted as appropriate.

The configuration illustrated in FIG. 8 is different from the configuration of the device 11 of FIG. 2 in that a location information acquisition section 111 is added. Further, specific location information is added in the definition information 51 of the storage section 34. In the example of FIG. 8, also in view of the location of the user, it is determined which of the usage-permitted state and the usage-unpermitted state a protection-target region is to be brought to.

The location information acquisition section 111 acquires location information relating to the device 11 by using, for example, GPS or the like. The location information acquisition section 111 acquires the location information relating to the device 11 and outputs the acquired location information to the device host 33.

In the definition information 51, the specific location information which indicates specific areas, such as an urban area and a specific venue, within which the protection-target region is to be brought to the usage-unpermitted state is defined.

In the case where the location information relating to the device 11 and having been supplied from the location information acquisition section 111 falls within a range specified by the defined specific location information, the device host 33 brings the protection-target region to the usage-unpermitted state.

Figure 9:
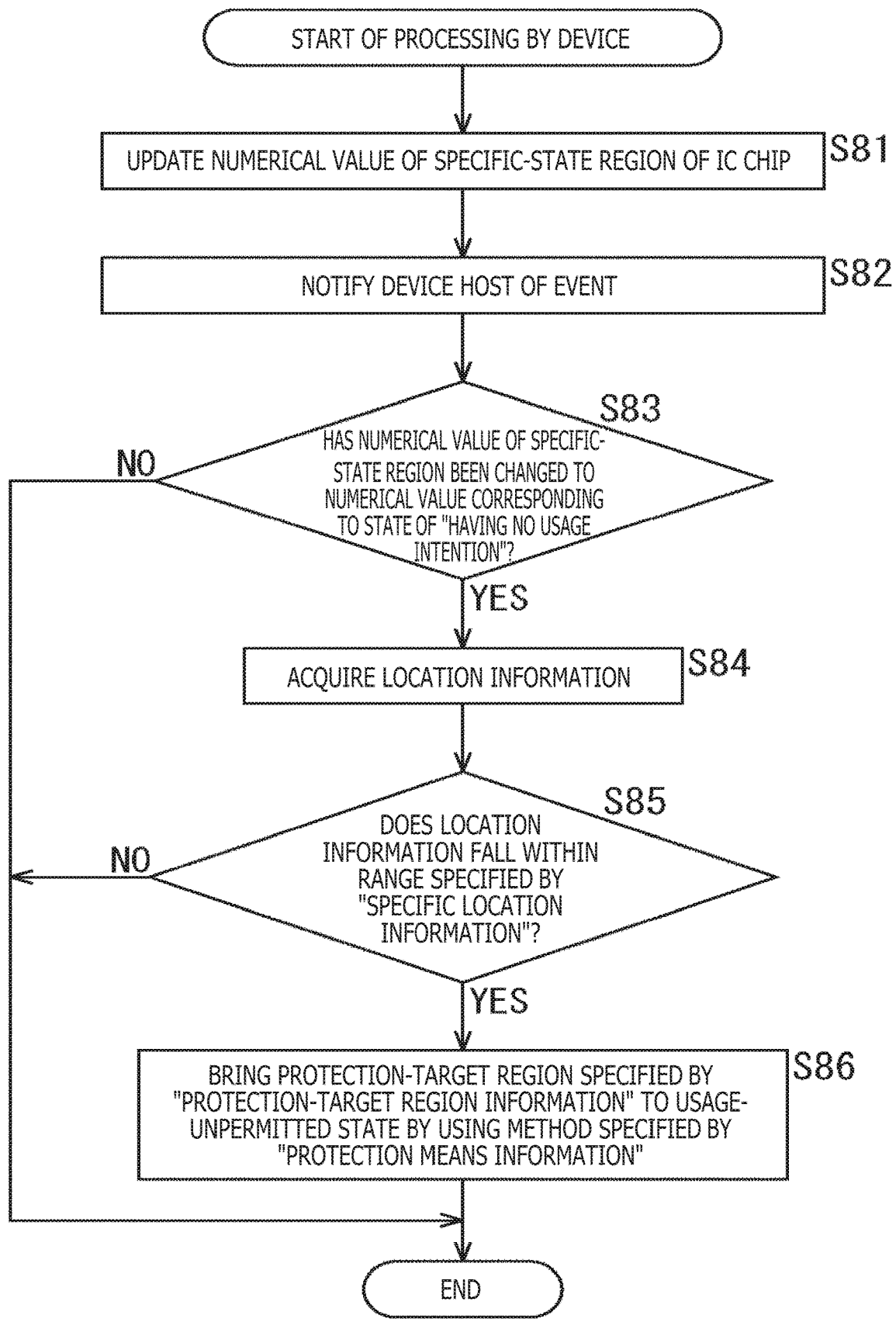
FIG. 9 is a flowchart that describes processing by the device of FIG. 8.

<Operation of Device>
FIG. 9 is a flowchart that describes processing by the device of FIG. 8.

Processes in steps S81 to S83 of FIG. 9 are the same as the processes in steps S31 to S33 of FIG. 5, and thus, descriptions thereof will be omitted.

In the case where it is determined in step S83 that the numerical value of the specific-state region has been changed to a numerical value corresponding to the state of "having no usage intention," in step S84, the location information acquisition section 111 acquires location information relating to the device 11 and outputs the acquired location information to the device host 33.

In step S85, the device host 33 determines whether or not the location information relating to the device 11 and having been supplied from the location information acquisition section 111 falls within a range specified by the defined "specific location information."

In the case where it is determined in step S85 that the location information relating to the device 11 falls within the range specified by the "specific location information," the processing proceeds to step S86.

In step S86, on the basis of the definition information 51 of the storage section 34, the device host 33 brings a protection-target region formed in the protection-target region 42 and specified by the "protection-target region information" to the usage-unpermitted state by using a method specified by the "protection means information."

In the case where it is determined in step S83 that the numerical value of the specific-state region has not been changed to any of numerical values each corresponding to the state of "having no usage intention," processes in steps S84 to S86 are skipped, and the processing by the device 11 is ended. In the case where it is determined in step S85 that the location information relating to the device 11 does not fall within the range specified by the "specific location information," similarly, the processing by the device 11 is ended.

As described above, within a range specified by the "specific location information" indicating a specific venue and the like, a protection-target region can be brought to the usage-unpermitted state according to a specific state of the user.

4. Fourth Embodiment (Example of Determination as to Permission/Non-Permission of Usage Further Based on Numerical Value of Information Regarding Protection-Target Region)

Figure 10:
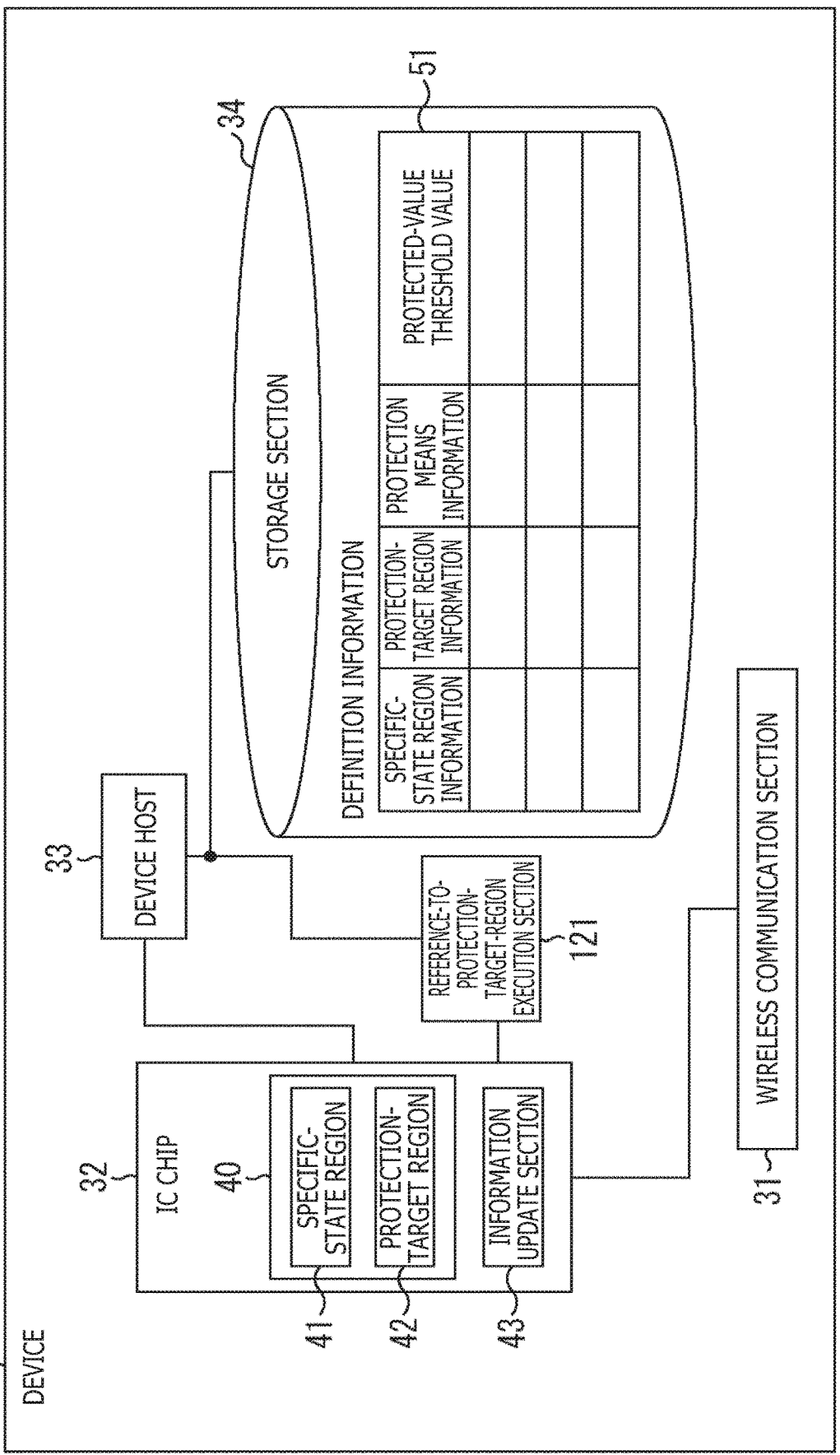
FIG. 10 is a block diagram illustrating a fourth configuration example of a device.

<Configuration Example of Device>
FIG. 10 is a block diagram illustrating a fourth configuration example of the device.

In the device 11 of FIG. 10, a protection-target region is brought to the usage-unpermitted state according to a numerical value of information recorded in the protection-target region. Examples of the numerical value of information recorded in the protection-target region include an electronic money balance and the like.

Among constituent elements illustrated in FIG. 10, the same constituent element as that having been described with reference to FIG. 2 is denoted by the same reference sign. Its repeated description will be omitted as appropriate.

The configuration in FIG. 10 is different from the configuration of the device 11 of FIG. 2 in that a reference-to-protection-target-region execution section 121 is added. Further, a protected-value threshold value is added in the definition information 51 of the storage section 34. In the example of FIG. 10, also in view of the magnitude of value stored in a protection-target region, it is determined which of the usage-permitted state and the usage-unpermitted state the protection-target region is to be brought to.

The reference-to-protection-target-region execution section 121 refers to a protection-target region targeted for protection, to acquire a numerical value of information recorded in the protection-target region, and outputs the acquired numerical value of information to the device host 33.

The definition information 51 defines a protected-value threshold value that is a threshold value with which the numerical value of the information recorded in the protection-target region is compared in a determination as to whether or not the protection-target region is to be brought to the usage-unpermitted state.

In the case where the numerical value of the information, having been supplied from the reference-to-protection-target-region execution section 121, is larger than the defined protected-value threshold value, the device host 33 brings the protection-target region to the usage-unpermitted state.

Figure 11:
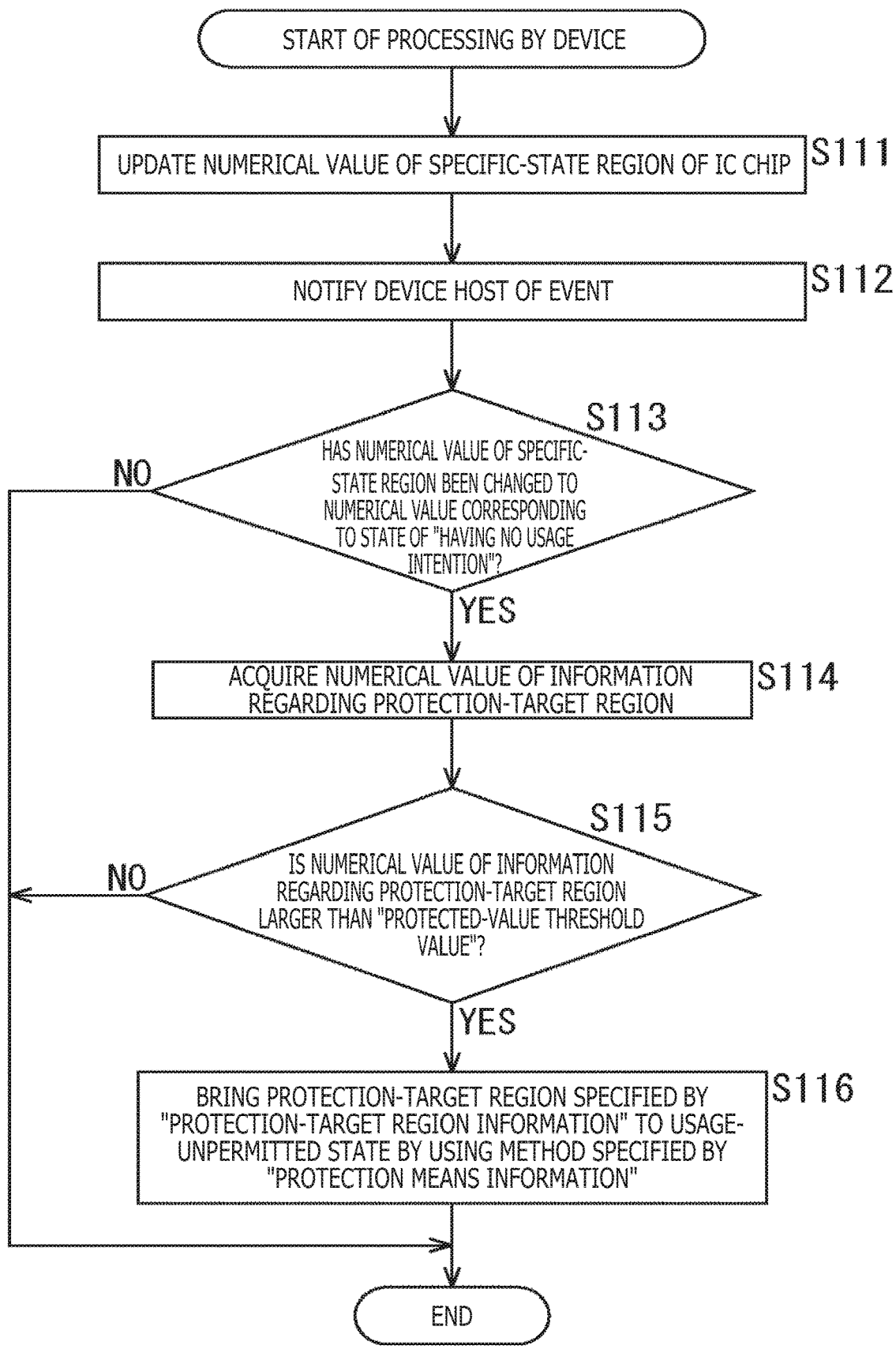
FIG. 11 is a flowchart that describes processing by the device of FIG. 10.

<Operation of Device>
FIG. 11 is a flowchart that describes processing by the device of FIG. 10.

Processes in steps S111 to S113 of FIG. 11 are the same as the processes in steps S31 to S33 of FIG. 5, and thus, descriptions thereof will be omitted.

In the case where it is determined in step S113 that the numerical value of the specific-state region has been changed to a numerical value corresponding to the state of "having no usage intention," in step S114, the reference-to-protection-target-region execution section 121 acquires a numerical value of information recorded in a protection-target region and outputs the acquired numerical value to the device host 33.

In step S115, the device host 33 determines whether or not the numerical value having been supplied from the location information acquisition section 111 is larger than the defined "protected-value threshold value."

In the case where it is determined in step S115 that the numerical value is larger than the "protected-value threshold value," the processing proceeds to step S116.

In step S116, on the basis of the definition information 51 of the storage section 34, the device host 33 brings the protection-target region formed in the protection-target region 42 and specified by the "protection-target region information" to the usage-unpermitted state by using a method specified by the "protection means."

In the case where it is determined in step S113 that the numerical value of the specific-state region has not been changed to any of numerical values each corresponding to the state of "having no usage intention," processes in steps S114 to S116 are skipped, and the processing by the device 11 is ended. In the case where it is determined in step S155 that the numerical value is smaller than the "protected-value threshold value," similarly, the processing by the device 11 is ended.

As described above, a protection-target region can be brought to the usage-unpermitted state according to a specific state of the user and the magnitude of a numerical value, such as a balance, recorded in the protection-target region.

5. Fifth Embodiment (Example of Determination as to Permission/Non-Permission of Usage Further Based on Constant Period of Time)

<Configuration Example of Device>

Figure 12:
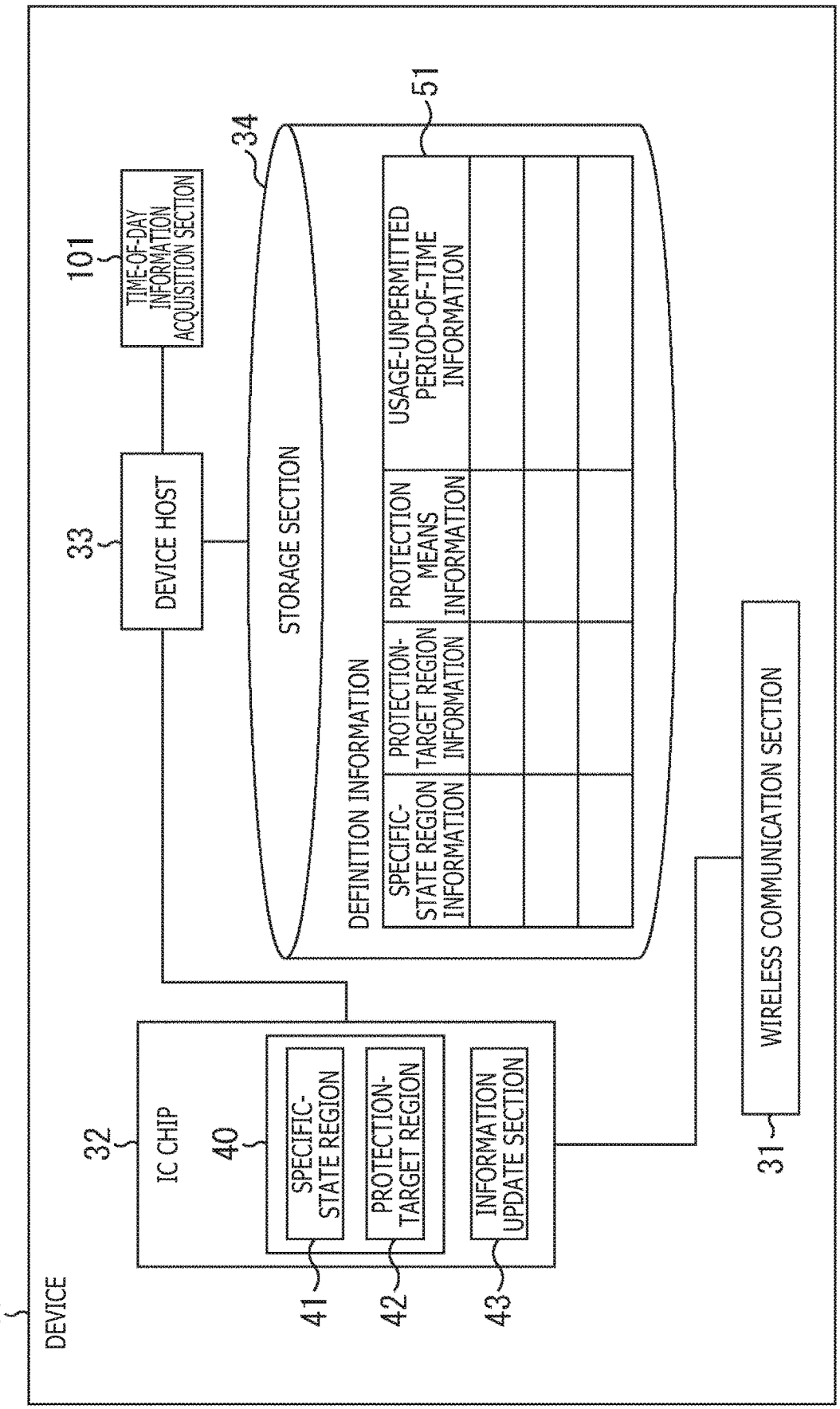
FIG. 12 is a block diagram illustrating a fifth configuration example of a device.

FIG. 12 is a block diagram illustrating a fifth configuration example of the device.

In the device 11 of FIG. 12, a protection-target region is brought to the usage-unpermitted state only during a constant period of time recorded in the protection-target region.

Among constituent elements illustrated in FIG. 12, the same constituent element as that having been described with reference to FIG. 6 is denoted by the same reference sign. Its repeated description will be omitted as appropriate.

The configuration illustrated in FIG. 12 is similar to the configuration of the device 11 of FIG. 6. In the definition information 51 of the storage section 34, usage-unpermitted period-of-time information is added instead of the time zone information. In the example of FIG. 12, in view of a specific state of the user, it is determined which of the usage-permitted state and the usage-unpermitted state a protection-target region is to be brought to. Further, during a constant period of time specified by the usage-unpermitted period-of-time information after the determination that the protection-target region is to be brought to the usage-unpermitted state has been made, it is determined that the protection-target region is to remain in the usage-unpermitted state.

The time-of-day information acquisition section 101 acquires time-of-day information inside the device 11 and outputs the acquired time-of-day information to the device host 33.

The definition information 51 defines the usage-unpermitted period-of-time information as the constant period of time during which the protection-target region is to remain in the usage-unpermitted state.

The device host 33 brings the protection-target region to the usage-unpermitted state according to the specific state of the user, and then, brings the protection-target region to the usage-permitted state in the case where the period of time specified by the defined usage-unpermitted period-of-time information has elapsed.

<Operation of Device>

Figure 13:
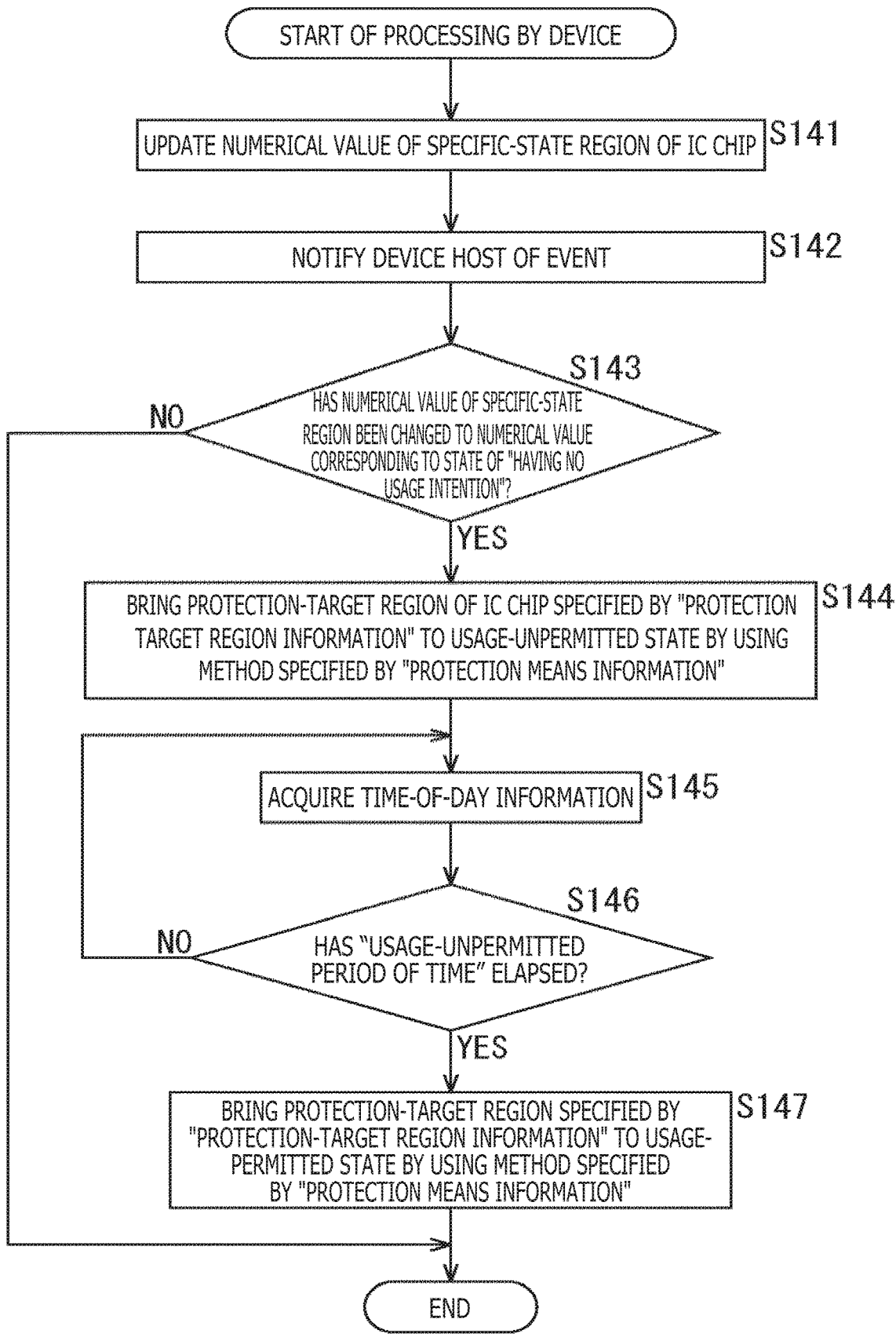
FIG. 13 is a flowchart that describes processing by the device of FIG. 12.

FIG. 13 is a flowchart that describes processing by the device of FIG. 12.

Processes in steps S141 to S143 of FIG. 13 are the same as the processes in steps S31 to S33 of FIG. 5, and thus, descriptions thereof will be omitted.

In the case where it is determined in step S143 that the numerical value of the specific-state region has been changed to a numerical value corresponding to the state of "having no usage intention," in step S144, on the basis of definition information stored in the storage section 34 and relating to the usage-unpermitted state, the device host 33 brings a protection-target region formed in the protection-target region 42 and specified by the "protection-target region information" to the usage-unpermitted state by using a method specified by the "protection means."

In step S145, the time-of-day information acquisition section 101 acquires the time-of-day information inside the device 11 and outputs the acquired time-of-day information to the device host 33.

In step S146, the device host 33 refers to the time-of-day information being inside the device 11 and having been supplied from the time-of-day information acquisition section 101, and determines whether or not the "usage-unpermitted period of time" has elapsed after having brought the protection-target region formed in the protection-target region 42 and specified by the "protection-target region information" to the usage-unpermitted state.

In the case where it is determined in step S146 that the "usage-unpermitted period of time" has not yet elapsed, the processing returns to step S145, and the processes in step S145 and the following steps are repeated.

In the case where it is determined in step S146 that the "usage-unpermitted period of time" has elapsed, the processing proceeds to step S147.

In step S147, on the basis of the definition information 51 of the storage section 34, the device host 33 brings the protection-target region formed in the protection-target region 42 and specified by the "protection-target region information" to the usage-permitted state by using a method specified by the "protection means."

In the case where it is determined in step S143 that the numerical value of the specific-state region has not been changed to any of numerical values each corresponding to the state of "having no usage intention," processes in steps S144 to S147 are skipped, and the processing by the device 11 is ended.

As described above, a protection-target region is brought to the usage-unpermitted state according to a specific state of the user, and then, after an elapse of the "usage-unpermitted period of time," which is a constant period of time, the protection-target region can be brought to the usage-permitted state.

6. Sixth Embodiment (Example of Determination as to Permission/Non-Permission of Usage Further Based on Time Information Associated with State Information Regarding Specific-State Region)

<Configuration Example of Device>

Figure 14:
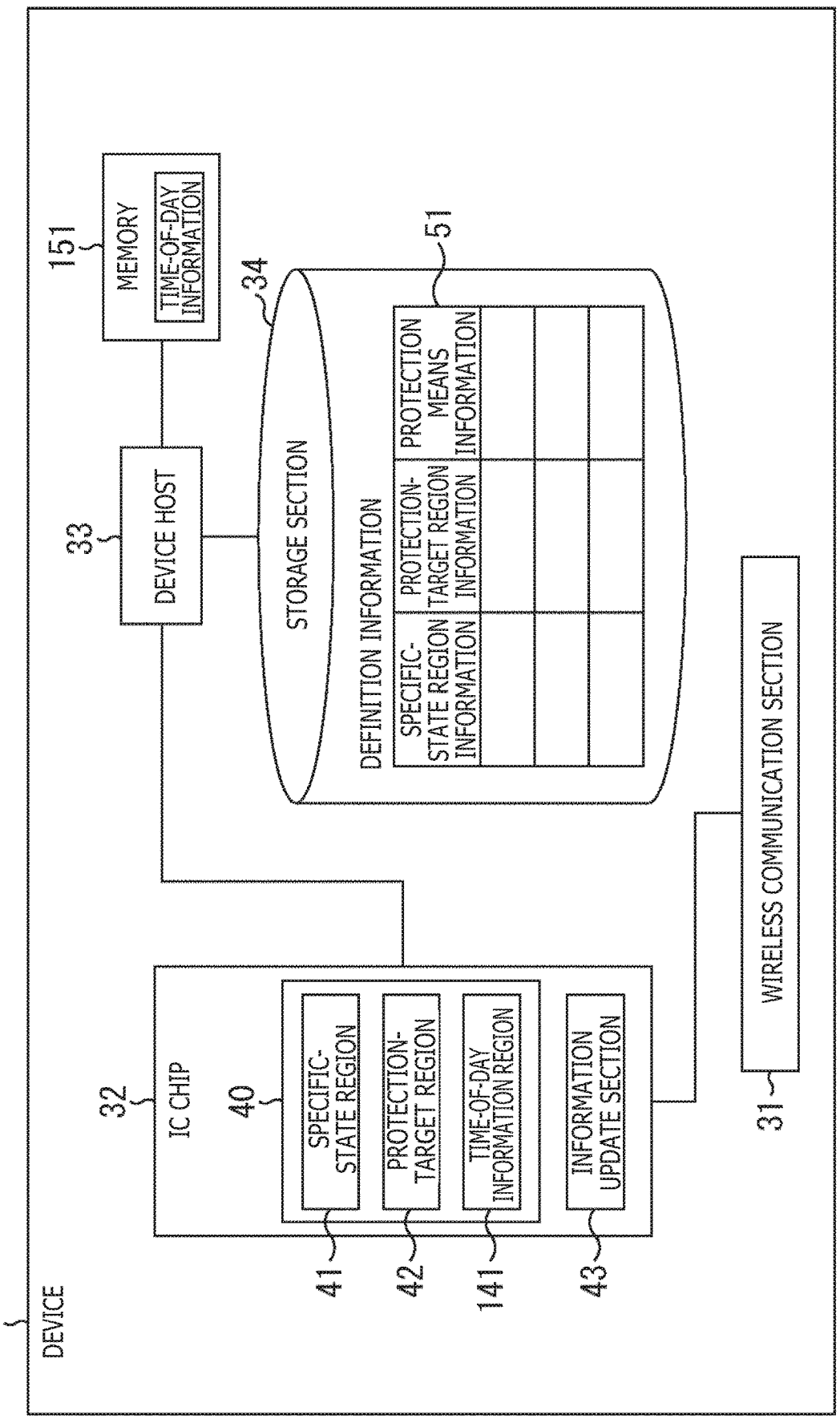
FIG. 14 is a block diagram illustrating a sixth configuration example of a device.

FIG. 14 is a block diagram illustrating a sixth configuration example of the device.

In the device 11 of FIG. 14, a protection-target region is brought to the usage-unpermitted state or the usage-permitted state according to performance time information relating to a concert ticket or the like and associated with state information stored in a specific-state region.

Among constituent elements illustrated in FIG. 14, the same constituent element as that having been described with reference to FIG. 2 is denoted by the same reference sign. Its repeated description will be omitted as appropriate.

The configuration in FIG. 14 is different from that of the device 11 of FIG. 2 in that a time-of-day information region 141 is added in the memory 40 of the IC chip 32. Further, the configuration in FIG. 14 is different from that of the device 11 of FIG. 2 in that a memory 151 that stores time-of-day information is added. In the example in FIG. 14, also in view of time information associated with state information regarding a specific-state region, it is determined which of the usage-permitted state and the usage-unpermitted state a protection-target region is to be brought to.

The time-of-day information region 141 of the memory 40 of the IC chip 32 is a region that stores, for example, time-of-day information (performance time) relating to a concert ticket or the like and associated with state information stored in a specific-state region formed in the specific-state region 41.

When the numerical value of a specific-state region has been changed to a numerical value corresponding to a state in which the user has no usage intention, the device host 33 acquires the time-of-day information from the time-of-day information region 141 and allows the memory 151 to retain the acquired time-of-day information.

The device host 33 brings a protection-target region to the usage-unpermitted state in the case where start time-of-day specified by the time-of-day information of the memory 151 has arrived. The device host 33 brings the protection-target region to the usage-permitted state in the case where end time-of-day specified by the time-of-day information of the memory 151 has arrived.

<Operation of Device>

Figure 15:
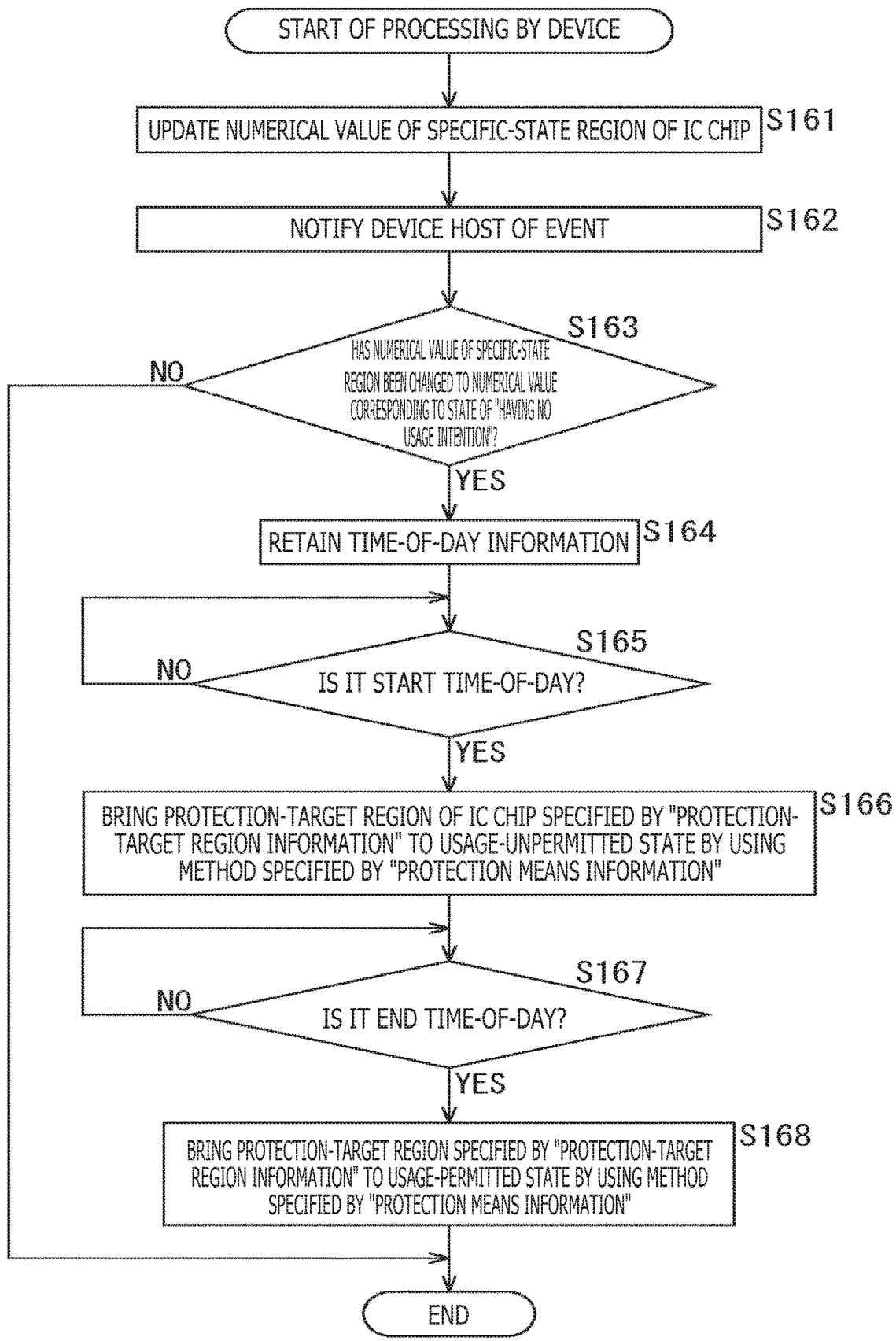
FIG. 15 is a flowchart that describes processing by the device of FIG. 14.

FIG. 15 is a flowchart that describes processing by the device of FIG. 14.

Processes in steps S161 to S163 of FIG. 15 are the same as the processes in steps S31 to S33 of FIG. 5, and thus, descriptions thereof will be omitted.

In the case where it is determined in step S163 that the numerical value of the specific-state region has been changed to a numerical value corresponding to the state of "having no usage intention," in step S164, the device host 33 acquires time-of-day information from the time-of-day information region 141 of the IC chip 32 and allows the memory 151 to retain the acquired time-of-day information.

In step S165, the device host 33 refers to the time-of-day information of the memory 151 and waits until it is determined that start time-of-day specified by the time-of-day information has arrived.

In step S165, in the case where it is determined that the start time-of-day specified by the time-of-day information has arrived, the processing proceeds to step S166.

In step S166, on the basis of the definition information 51 of the storage section 34, the device host 33 brings a protection-target region formed in the protection-target region 42 and specified by the "protection-target region information" to the usage-unpermitted state by using a method specified by the "protection means."

In step S167, the device host 33 refers to the time-of-day information of the memory 151 and waits until it is determined that end time-of-day specified by the time-of-day information has arrived.

In step S167, in the case where it is determined that the end time-of-day specified by the time-of-day information has arrived, the processing proceeds to step S168.

In step S168, on the basis of the definition information 51 of the storage section 34, the device host 33 brings the protection-target region formed in the protection-target region 42 and specified by the "protection-target region information" to the usage-permitted state by using a method specified by the "protection means."

In the case where it is determined in step S163 that the numerical value of the specific-state region has not been changed to any of numerical values each corresponding to the state of "having no usage intention," processes in steps S164 to S168 are skipped, and the processing by the device 11 is ended.

As described above, a protection-target region can be brought to the usage-unpermitted state or the usage-permitted state according to performance time relating to a concert ticket or the like and associated with state information stored in a specific-state region formed in the specific-state region 41 of the IC chip 32.

7. Seventh Embodiment (Example of Determination as to Permission/Non-Permission of Usage Further Based on Total Number of Usage of Specific-State Region)

<Configuration Example of Device>

Figure 16:
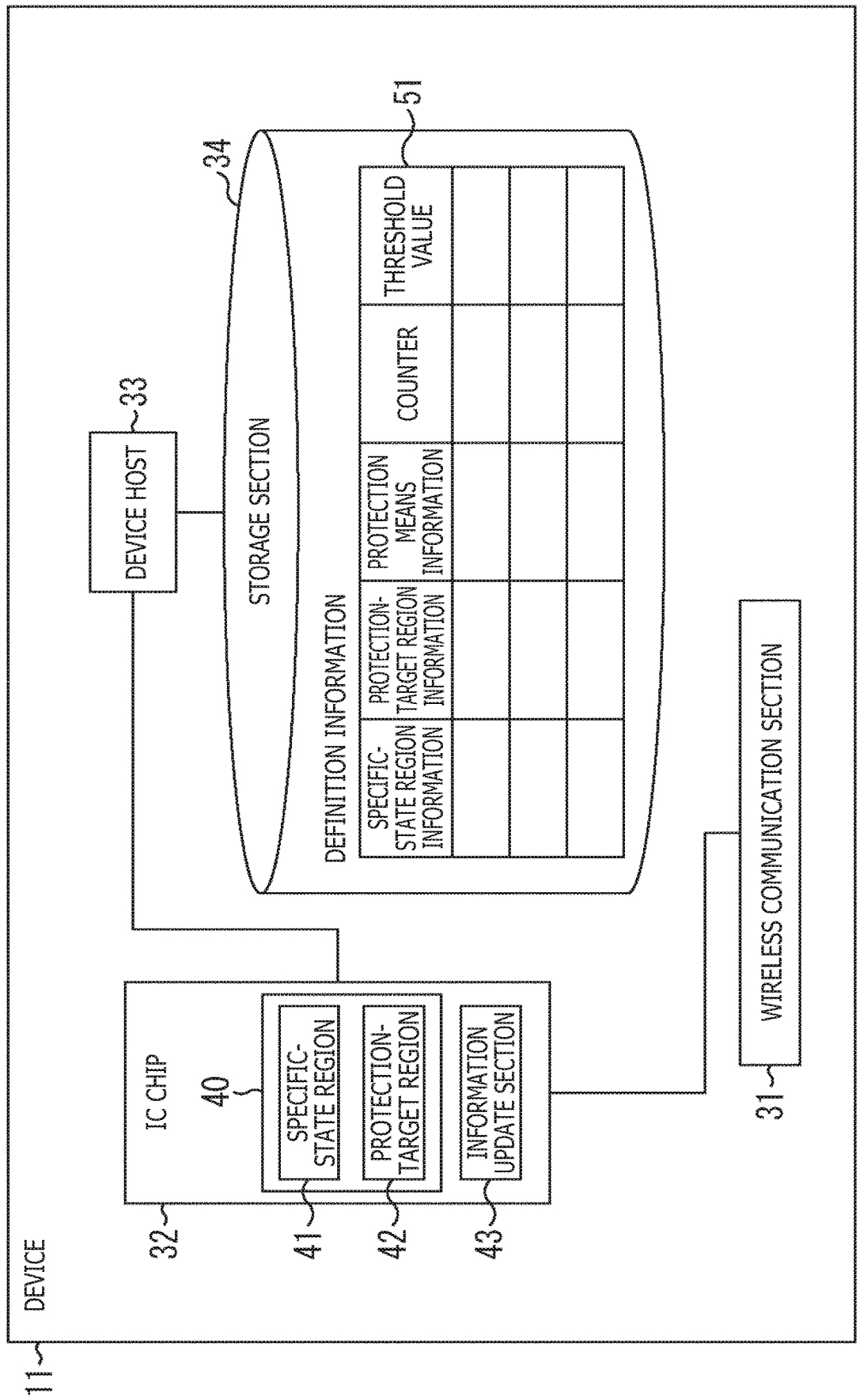
FIG. 16 is a block diagram illustrating a seventh configuration example of a device.

FIG. 16 is a block diagram illustrating a configuration example of a device in a seventh configuration example of the wireless communication system according to the present technology.

In the device 11 of FIG. 16, a protection-target region is brought to the usage-unpermitted state according to the total number of usage of a specific-state region.

Among constituent elements illustrated in FIG. 16, the same constituent element as that having been described with reference to FIG. 2 is denoted by the same reference sign. Its repeated description will be omitted as appropriate.

The configuration illustrated in FIG. 16 is similar to the configuration of the device 11 of FIG. 2. Further, a counter and a threshold value are added in the definition information 51 of the storage section 34. In the example of FIG. 16, also in view of the total number of usage of a specific-state region, the total number being counted by the counter, it is determined which of the usage-permitted state and the usage-unpermitted state a protection-target region is to be brought to.

In the definition information 51, the counter, which counts the total number of usage of the specific-state region, and the threshold value for the total number of usage, which is used for bringing the protection-target region to the usage-unpermitted state, are defined so as to be associated with the specific-state region.

When the numerical value of a specific-state region has been changed to a numerical value corresponding to a state in which the user has no usage intention, the device host 33 increments by one the counter included in the definition information 51 and associated with the specific-state region. In the case where the total number of the usage that is indicated by the counter is equal to or larger than the threshold value, the device host 33 brings the protection-target region to the usage-unpermitted state.

<Operation of Device>

Figure 17:
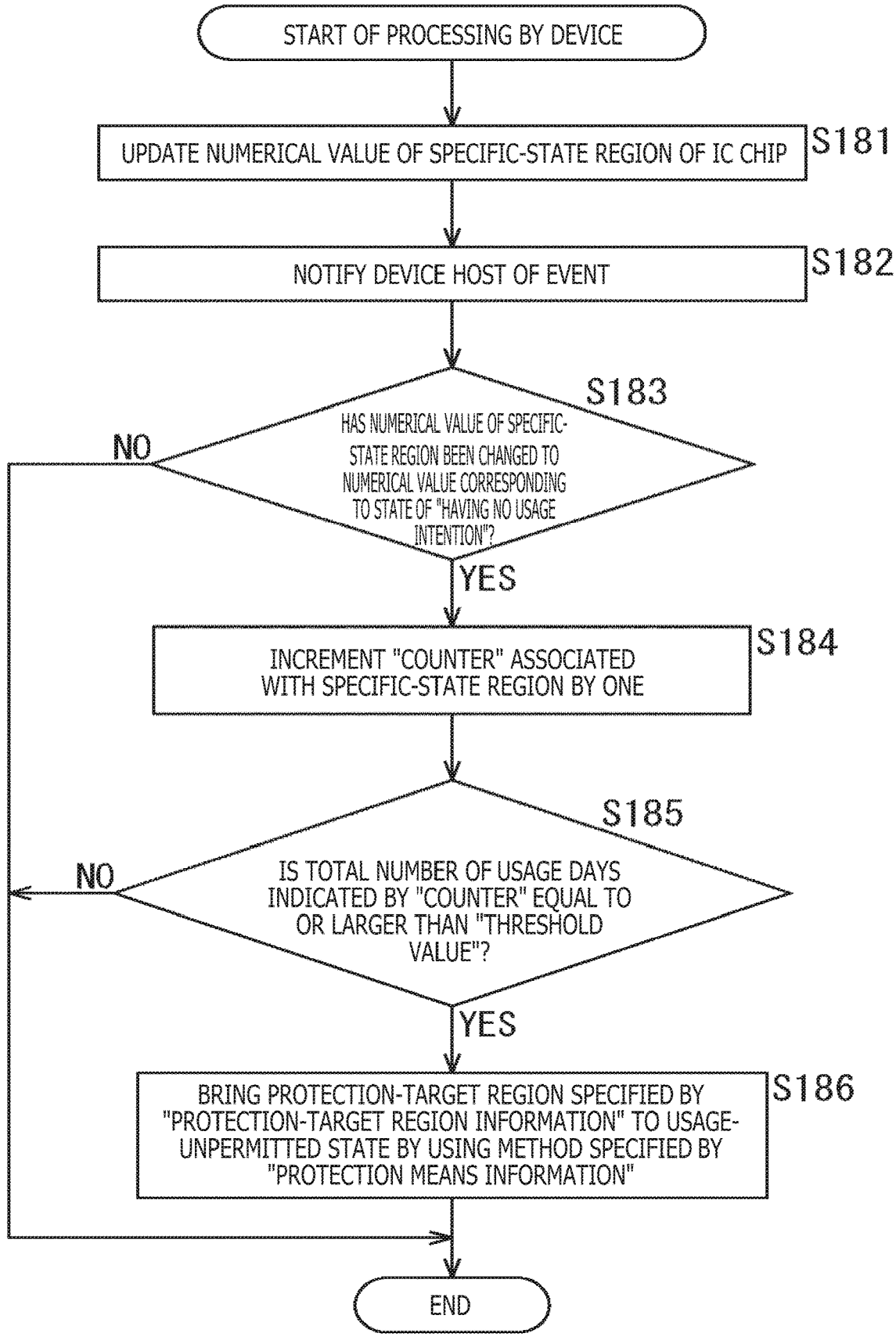
FIG. 17 is a flowchart that describes processing by the device of FIG. 16.

FIG. 17 is a flowchart that describes processing by the device of FIG. 16.

Processes in steps S181 to S183 of FIG. 17 are the same as the processes in steps S31 to S33 of FIG. 5, and thus, descriptions thereof will be omitted.

In the case where it is determined in step S183 that the numerical value of the specific-state region has been changed to a numerical value corresponding to the state of "having no usage intention," in step S184, the device host 33 increments by one the counter associated with the specific-state region.

In step S185, the device host 33 determines whether or not the total number of the usage that is indicated by the "counter" is equal to or larger than the "threshold value."

In the case where it is determined in step S185 that the total number of the usage that is indicated by the "counter" is equal to or larger than the "threshold value," the processing proceeds to step S186.

In step S186, on the basis of the definition information 51 of the storage section 34, the device host 33 brings a protection-target region formed in the protection-target region 42 and specified by the "protection-target region information" to the usage-unpermitted state by using a method specified by the "protection means."

In the case where it is determined in step S183 that the numerical value of the specific-state region has not been changed to any of numerical values each corresponding to the state of "having no usage intention," processes in steps S184 to S186 are skipped, and the processing by the device 11 is ended. In the case where it is determined in step S185 that the total number of the usage that is indicated by the "counter" is smaller than the "threshold value," similarly, the processing by the device 11 is ended.

As described above, a protection-target region can be brought to the usage-unpermitted state according to the total number of usage of a specific-state region. This configuration makes it possible to bring a protection-target region to the usage-unpermitted state only during daily usage of a commuting section. The protection-target region can be brought to the usage-unpermitted state by separating the daily usage and non-daily usage. Thus, a protection-target region can be brought to the usage-unpermitted state even only during the non-daily usage.

Note that the configurations of the device 11 of the wireless communication system 1 in the above-described first to seventh embodiments are not limited to the individual embodiments alone and can be used in combinations thereof.

According to the present technology, every time the user makes a change between usage and non-usage, a protection-target region of the device can be brought to the usage-unpermitted state without any setting changes, provided that the user has no intention of the usage thereof. This configuration makes it possible to eliminate or minimize unauthorized usage of the IC chip.

Note that, although, in the foregoing description, examples of the device 11 including the IC chip 32 have been described, the present technology can also be applied to an IC card.

8. Computer

<Hardware Configuration of Computer>

The above-described series of processes can be executed by hardware and can be executed by software. In the case where the series of processes is to be executed by software, a program constituting the software is installed in a computer. Here, the computer encompasses a computer incorporated in dedicated hardware and, for example, a general-purpose personal computer or the like that is capable of executing various kinds of functions by allowing various kinds of programs to be installed therein.

FIG. 18 is a block diagram illustrating a configuration example of hardware of a computer that executes the above-described series of processes by using a program.

In the computer, a CPU (Central Processing Unit) 301, a ROM (Read Only Memory) 302, and a RAM (Random Access Memory) 304 are connected to each other via a bus 304.

Further, an input/output interface 305 is connected to the bus 304. The input/output interface 305 is connected to an input section 306, an output section 307, a storage section 308, a communication section 309, and a drive 310.

The input section 306 includes a keyboard, a mouse device, a microphone, and any other input equipment. The output section 307 includes a display, a speaker, and any other output equipment. The storage section 308 includes a hard disk, a non-volatile memory, and any other storage device. The communication section 309 includes a network interface and any other network communication component. The drive 310 drives a removable medium 311, such as a magnetic disk, an optical disk, a magneto-optical disk, or a semiconductor memory.

In the computer configured in such a way as described above, the above-described series of processes is performed by allowing the CPU 301 to load programs stored in, for example, the storage section 308 into the RAM 303 via the input/output interface 305 and the bus 304 and execute the loaded programs.

The programs to be executed by the computer (CPU 301) can be provided in a way that allows the programs to be recorded in the removable medium 311 serving as, for example, a package medium or the like. Further, the programs can be provided via a wired or wireless transmission medium such as a local area network, the Internet, or digital satellite broadcasting.

In the computer, the programs can be installed into the storage section 308 via the input/output interface 305 in a way that allows the removable medium 311 to be mounted into the drive 310. Further, the programs can be installed into the storage section 308 in a way that allows the communication section 309 to receive the programs via the wired or wireless transmission medium. In addition thereto, the programs can be installed in advance in the ROM 302 or the storage section 308.

Note that the programs to be executed by the computer may be programs that allow processes to be performed in time series in order described in the present specification or programs that allow processes to be performed in parallel or at necessary timings such as a timing at which a call has been made.

Further, in the present specification, the system means a set of a plurality of constituent elements (devices, modules (parts), etc.), and it does not matter whether or not all of the constituent elements are housed in the same housing. Accordingly, plural devices housed in separate housings and coupled to each other via a network and one device that houses a plurality of modules in one housing are both systems.

Note that the effects described in the present specification are just examples, the effects of the present technology not being limited thereto, and there may be other effects.

The embodiments of the present technology are not limited to the above-described embodiments, and various modifications can be made within the scope not departing from the gist of the present technology.

For example, the present technology can have a cloud computing configuration in which one function is shared and jointly processed by plural devices via networks.

Further, the individual steps having been described in the above-described flowcharts can be performed not only by one device, but also by plural devices in a shared manner.

Furthermore, in the case where a plurality of processes is included in one step, the plurality of processes included in the one step can be performed not only by one device, but also by plural devices in a shared manner.

[Combination Examples of Configuration]

The present technology can also have the following configurations.

(1)

A mobile terminal including:

an IC chip including a memory forming a protection-target region that is a storage region for predetermined information targeted for protection and a specific-state region that is a storage region for state information representing a specific state of a user; and a control section that performs control so as to bring the protection-target region to a usage-unpermitted state in a case where, in the IC chip, the state information is changed to information representing a state in which the predetermined information is not used.

(2)

The mobile terminal according to (1), in which the memory forms, for respective kinds of a plurality of pieces of the predetermined information, a plurality of the protection-target regions, and forms a plurality of the specific-state regions that stores the pieces of state information used for determination as to permission/non-permission of usage of the respective protection-target regions.

(3)

The mobile terminal according to (1) or (2), in which, in the IC chip, execution of a command changes the state information to the information representing the state in which the predetermined information is not used.

(4)

The mobile terminal according to any one of (1) to (3), further including:

a retaining section that retains definition information that defines a piece of state information that is included in the pieces of state information and that brings each of the protection-target regions to the usage-unpermitted state, in which the control section makes a determination as to permission/non-permission of a usage of each of the protection-target regions on the basis of the definition information.

(5)

The mobile terminal according to (4), in which the definition information further defines a method of protecting each of the protection-target regions, and the control section performs control so as to bring a protection-target region among the protection-target regions to the usage-unpermitted state, according to the method defined by the definition information.

(6)

The mobile terminal according to (5), in which the control section brings a protection-target region among the protection-target regions to the usage-unpermitted state by stopping reception of the command by the IC chip.

(7)

The mobile terminal according to (6), in which the command includes a command that is transmitted from an external device through wired communication or wireless communication.

(8)

The mobile terminal according to (5), in which the control section brings a protection-target region among the protection-target regions to the usage-unpermitted state by making the protection-target region invisible.

(9)

The mobile terminal according to (4), in which the definition information includes information indicating a time zone, and the control section brings a protection-target region among the protection-target regions to the usage-unpermitted state during the time zone.

(10)

The mobile terminal according to (4), in which the definition information includes information indicating a location range, and, in a case where a location of the mobile terminal is a location falling within the location range, the control section brings a protection-target region among the protection-target regions to the usage-unpermitted state.

(11)

The mobile terminal according to (4), in which the definition information includes information indicating a threshold value for a piece of predetermined information among the pieces of predetermined information, and, in a case where the piece of predetermined information regarding a protection-target region among the protection-target regions is equal to or larger than the threshold value, the control section brings the protection-target region to the usage-unpermitted state.

(12)

The mobile terminal according to (4), in which the definition information includes period-of-time information indicating a period of time during which a protection-target region among the protection-target regions is to be brought to the usage-permitted state, and, in a case where the period of time indicated by the period-of-time information has elapsed after the protection-target region has been brought to the usage-unpermitted state, the control section brings the protection-target region to the usage-permitted state.

(13)

The mobile terminal according to (4), in which the definition information includes information indicating a total number of usage of a specific-state region among the specific-state regions and information indicating a threshold value for the total number of the usage, and, in a case where the total number of the usage is equal to or larger than a number indicated by the threshold value, the control section brings a protection-target region among the protection-target regions to the usage-unpermitted state.

(14)

The mobile terminal according to any one of (4) to (13), further including:

another memory that retains time-of-day information that is sent from the IC chip and that is information including start time-of-day and end time-of-day of a predetermined event, in which the control section brings a protection-target region among the protection-target regions to the usage-unpermitted state on the basis of the time-of-day information retained in the another memory.

(15)

The mobile terminal according to (14), in which, in a case where current time-of-day has reached the start time-of-day indicated by the time-of-day information, the control section brings the protection-target region to the usage-unpermitted state.

(16)

The mobile terminal according to (15), in which, in a case where the current time-of-day has reached the end time-of-day indicated by the time-of-day information, the control section brings the protection-target region to the usage-permitted state.

(17)

The mobile terminal according to (1) to (16), in which the predetermined information includes electronic money information and personal information.

(18)

An IC chip management method including:

performing control by a mobile terminal including an IC chip that includes a memory forming a protection-target region that is a storage region for predetermined information targeted for protection and a specific-state region that is a storage region for state information representing a specific state of a user, the control being performed to bring the protection-target region to a usage-unpermitted state in a case where, in the IC chip, the state information is changed to information representing a state in which the predetermined information is not used.

REFERENCE SIGNS LIST

1 Wireless communication system, 11 Device, 12 Reader/writer, 31 Wireless communication section, 32 IC chip, 33 Device host, 34 Storage section, 40 Memory, 41 Specific-state region, 42 Protection-target region, 43 Information update section, 51 Definition information for usage-unpermitted state, 71 Wireless communication section, 72 Controller, 73 Storage section, 81 Specific-state region, 91 Inside/outside-ticket-gate state region, 92 Inside/outside-concert-venue state region, 101 Time-of-day information acquisition section, 111 Location information acquisition section, 121 Reference-to-protection-target-region execution section 151 Memory

The invention claimed is:

1. A mobile terminal comprising:
an IC chip including a memory forming a protection-target region that is a storage region for predetermined information targeted for protection and a specific-state region that is a storage region for state information representing a specific state of a user; and
a control section configured to
perform control so as to bring the protection-target region to a usage-unpermitted state in a case where, in the IC chip, the state information is changed to information representing a first state in which the IC chip is located outside a specific area at a first location in which the predetermined information is not used, and
perform control so as to bring the protection-target region to a usage-permitted state in a case where, in the IC chip, the state information is changed to information representing a second state in which the IC chip is located inside the specific area at a second location in which the predetermined information is used,
wherein the state information is changed to the information representing the first state based on receiving a first command from a reader/writer for changing the state information to the information representing the first state,
wherein the state information is changed to information representing the second state based on receiving a second command from the reader/writer for changing the state information to the information representing the second state,
wherein the state information is not changed until the first command or the second command is received from the reader/writer, and
wherein the control section is implemented via at least one processor.

2. The mobile terminal according to claim 1, wherein the memory forms, for respective kinds of a plurality of pieces of the predetermined information, a plurality of the protection-target regions, and forms a plurality of the specific-state regions that stores pieces of state information used for determination as to permission/non-permission of usage of the respective protection-target regions.

3. The mobile terminal according to claim 1, wherein, in the IC chip, execution of a command changes the state information to the information representing the first state in which the predetermined information is not used.

4. The mobile terminal according to claim 3, further comprising:
a retaining section configured to retain definition information that defines a piece of state information that is included in pieces of state information and that brings each protection-target region of a plurality of the protection-target regions to the usage-unpermitted state,
wherein the control section is further configured to make a determination as to permission/non-permission of a usage of each of the protection-target regions on a basis of the definition information, and
wherein the retaining section is implemented via at least one processor.

5. The mobile terminal according to claim 4,
wherein the definition information further defines a method of protecting each of the protection-target regions, and
the control section is further configured to perform control so as to bring a protection-target region among the protection-target regions to the usage-unpermitted state, according to the method defined by the definition information.

6. The mobile terminal according to claim 5, wherein the control section is further configured to bring a protection-target region among the protection-target regions to the usage-unpermitted state by stopping reception of the command by the IC chip.

7. The mobile terminal according to claim 6, wherein the command includes a command that is transmitted from an external device through wired communication or wireless communication.

8. The mobile terminal according to claim 5, wherein the control section is further configured to bring a protection-target region among the protection-target regions to the usage-unpermitted state by making the protection-target region invisible.

9. The mobile terminal according to claim 4,
wherein the definition information includes information indicating a time zone, and
the control section is further configured to bring a protection-target region among the protection-target regions to the usage-unpermitted state during the time zone.

10. The mobile terminal according to claim 4,
wherein the definition information includes information indicating a location range, and
in a case where a location of the mobile terminal is a location falling within the location range, the control section is further configured to bring a protection-target region among the protection-target regions to the usage-unpermitted state.

11. The mobile terminal according to claim 4,
wherein the definition information includes information indicating a threshold value for a piece of the predetermined information among pieces of the predetermined information, and
in a case where the piece of predetermined information regarding a protection-target region among the protection-target regions is equal to or larger than the threshold value, the control section is further configured to bring the protection-target region to the usage-unpermitted state.

12. The mobile terminal according to claim 4,
wherein the definition information includes period-of-time information indicating a period of time during which a protection-target region among the protection-target regions is to be brought to the usage-permitted state, and
in a case where the period of time indicated by the period-of-time information has elapsed after the protection-target region has been brought to the usage-unpermitted state, the control section is further configured to bring the protection-target region to the usage-permitted state.

13. The mobile terminal according to claim 4,
wherein the definition information includes information indicating a total number of usage of a specific-state region among a plurality of the specific-state regions and information indicating a threshold value for the total number of the usage, and
in a case where the total number of the usage is equal to or larger than a number indicated by the threshold value, the control section is further configured to bring a protection-target region among the protection-target regions to the usage-unpermitted state.

14. The mobile terminal according to claim 4, further comprising:
another memory that retains time-of-day information that is sent from the IC chip and that is information including start time-of-day and end time-of-day of a predetermined event,
wherein the control section is further configured to bring a protection-target region among the protection-target regions to the usage-unpermitted state on a basis of the time-of-day information retained in the another memory.

15. The mobile terminal according to claim 14, wherein, in a case where current time-of-day has reached the start time-of-day indicated by the time-of-day information, the control section is further configured to bring the protection-target region to the usage-unpermitted state.

16. The mobile terminal according to claim 15, wherein, in a case where the current time-of-day has reached the end time-of-day indicated by the time-of-day information, the control section is further configured to bring the protection-target region to the usage-unpermitted state to the usage-permitted state.

17. The mobile terminal according to claim 1, wherein the predetermined information includes electronic money information and personal information.

18. An IC chip management method comprising:
performing control by a mobile terminal including an IC chip that includes a memory forming a protection-target region that is a storage region for predetermined information targeted for protection and a specific-state region that is a storage region for state information representing a specific state of a user, the control being performed to bring the protection-target region to a usage-unpermitted state in a case where, in the IC chip, the state information is changed to information representing a first state in which the IC chip is located outside a specific area at a first location in which the predetermined information is not used; and
performing control by the mobile terminal so as to bring the protection-target region to a usage-permitted state in a case where, in the IC chip, the state information is changed to information representing a second state in which the IC chip is located inside the specific area at a second location in which the predetermined information is used,
wherein the state information is changed to the information representing the first state based on receiving a first command from a reader/writer for changing the state information to the information representing the first state,
wherein the state information is changed to information representing the second state based on receiving a second command from the reader/writer for changing the state information to the information representing the second state, and
wherein the state information is not changed until the first command or the second command is received from the reader/writer.

19. A non-transitory computer-readable medium having embodied thereon a program, which when executed by a computer causes the computer to execute an IC chip management method, the method comprising:
performing control by a mobile terminal including an IC chip that includes a memory forming a protection-target region that is a storage region for predetermined information targeted for protection and a specific-state region that is a storage region for state information representing a specific state of a user, the control being performed to bring the protection-target region to a usage-unpermitted state in a case where, in the IC chip, the state information is changed to information representing a first state in which the IC chip is located outside a specific area at a first location in which the predetermined information is not used; and
performing control by the mobile terminal so as to bring the protection-target region to a usage-permitted state in a case where, in the IC chip, the state information is changed to information representing a second state in which the IC chip is located inside the specific area at a second location in which the predetermined information is used, wherein the state information is changed to the information representing the first state based on receiving a first command from a reader/writer for changing the state information to the information representing the first state, wherein the state information is changed to information representing the second state based on receiving a second command from the reader/writer for changing the state information to the information representing the second state, and wherein the state information is not changed until the first command or the second command is received from the reader/writer.

* * * * *